(12) United States Patent
Parduhn et al.

(10) Patent No.: US 9,599,275 B1
(45) Date of Patent: *Mar. 21, 2017

(54) SECURITY LIGHT OR OTHER TRAFFIC CONTROL DEVICE WITH ARTICULATING BRACKET

(71) Applicant: Pelco Products, Inc., Edmond, OK (US)

(72) Inventors: A. Philip Parduhn, Edmond, OK (US); Kennith E. George, Edmond, OK (US); Christopher J. Opie, Edmond, OK (US); Stephen P. Parduhn, Edmond, OK (US); Derric K. Drake, Stillwater, OK (US)

(73) Assignee: Pelco Products, Inc., Edmond, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/332,711

(22) Filed: Jul. 16, 2014

Related U.S. Application Data

(63) Continuation-in-part of application No. 14/215,008, filed on Mar. 16, 2014, now Pat. No. 9,316,349.
(Continued)

(51) Int. Cl.
  *F16M 11/04* (2006.01)
  *F16M 13/02* (2006.01)
  (Continued)

(52) U.S. Cl.
  CPC ............. *F16M 11/04* (2013.01); *F16M 11/08* (2013.01); *F16M 11/2014* (2013.01);
  (Continued)

(58) Field of Classification Search
  CPC ..... F21V 21/29; F16M 11/2064; F16M 11/04; F16M 11/08; F16M 11/2014
  (Continued)

(56) References Cited

U.S. PATENT DOCUMENTS

| 291,171 A | * | 1/1884 | Edmunds, Jr. | 439/11 |
| 1,772,284 A | * | 8/1930 | Johansson | 248/324 |

(Continued)

FOREIGN PATENT DOCUMENTS

| CA | 2415537 A1 | * | 9/2003 | |
| DE | 3603981 A1 | * | 7/1986 | F21V 21/26 |

(Continued)

OTHER PUBLICATIONS

Philips Roadway Lighting, "going Beyond the Road—Philips Office Road Application Guide," 2012, 8 pages, Philips Roadway Lighting, Rosemont, IL, USA. The exact date of publication is unknown. This document was published prior to the effective filing date of the instant application, namely, Mar. 15, 2013, and prior to any foreign priority date of the present application.

*Primary Examiner* — Eret McNichols
(74) *Attorney, Agent, or Firm* — Mary M. Lee

(57) ABSTRACT

An articulating clamp assembly for traffic control assemblies that include luminaires. The clamp assembly includes first and second clamp members. The first clamp member includes a male tubular fitting for telescopically engaging a female fitting on the luminaire. The second clamp member is attachable to the end of a luminaire arm by a tenon sleeve, to the side of a pole with saddle plate, or to a simplex fitting with a simplex mounting bracket. The front ends of the first and second clamp members have inter-engaging serrated faces that allow adjustable engagement of the two clamp members to adjust the position of the luminaire. Each clamp member defines a continuous end-to-end conductor path, and the articulating ends are formed to create a continuous concealed conductor path through the joint. The tenon sleeve may include a U-bolt to secure it to the luminaire arm.

13 Claims, 31 Drawing Sheets

Related U.S. Application Data

(60) Provisional application No. 61/847,439, filed on Jul. 17, 2013, provisional application No. 61/800,072, filed on Mar. 15, 2013.

(51) Int. Cl.

| | |
|---|---|
| *G08G 1/095* | (2006.01) |
| *F16M 11/20* | (2006.01) |
| *F16M 11/08* | (2006.01) |
| *F21V 21/29* | (2006.01) |

(52) U.S. Cl.
CPC ........ *F16M 11/2064* (2013.01); *F16M 13/02* (2013.01); *F21V 21/29* (2013.01); *G08G 1/095* (2013.01)

(58) Field of Classification Search
USPC ............................................ 248/289.11, 425
See application file for complete search history.

(56) References Cited

U.S. PATENT DOCUMENTS

| | | | |
|---|---|---|---|
| 2,439,009 A * | 4/1948 | Kujawski ........................ 403/56 |
| 2,456,182 A * | 12/1948 | Goble ........................ 285/153.3 |
| 3,072,374 A * | 1/1963 | Bodian ........................ 248/278.1 |
| 3,096,962 A * | 7/1963 | Meijs ........................ 248/276.1 |
| 3,104,067 A * | 9/1963 | Stiffel ........................ 362/421 |
| 3,586,280 A | 6/1971 | Parduhn |
| 3,764,099 A | 10/1973 | Parduhn |
| 3,854,685 A | 12/1974 | Parduhn |
| 4,032,248 A | 6/1977 | Parduhn et al. |
| D246,585 S | 12/1977 | Parduhn |
| D249,517 S | 9/1978 | Parduhn |
| 4,135,192 A | 1/1979 | Parduhn |
| 4,363,561 A | 12/1982 | Hsieh |
| D276,213 S | 11/1984 | Parduhn |
| 4,605,995 A * | 8/1986 | Pike ........................ 362/287 |
| D286,667 S | 11/1986 | Parduhn |
| 4,659,046 A | 4/1987 | Parduhn |
| 4,691,884 A | 9/1987 | Parduhn |
| 4,821,159 A * | 4/1989 | Pike ........................ 362/285 |
| D328,243 S | 7/1992 | Parduhn |
| D329,589 S | 9/1992 | Parduhn |
| D335,279 S | 5/1993 | Parduhn |
| 5,299,111 A | 3/1994 | Parduhn et al. |
| D373,947 S | 9/1996 | Parduhn |
| 5,611,513 A * | 3/1997 | Rosen ........................ 248/222.11 |
| D379,756 S | 6/1997 | Parduhn |
| 5,645,255 A | 7/1997 | Parduhn |
| 5,935,478 A | 8/1999 | Parduhn |
| 6,095,468 A * | 8/2000 | Chirico et al. ............. 248/282.1 |
| 6,174,101 B1 * | 1/2001 | Niehaus ........................ 403/116 |
| 6,204,446 B1 | 3/2001 | Parduhn |
| 6,357,709 B1 | 3/2002 | Parduhn |
| 6,409,134 B1 * | 6/2002 | Oddsen, Jr. ................. 248/274.1 |
| 6,478,274 B1 * | 11/2002 | Oddsen, Jr. ................. 248/274.1 |
| 6,601,811 B1 * | 8/2003 | Van Lieshout ............ 248/282.1 |
| 6,609,691 B2 * | 8/2003 | Oddsen, Jr. ................. 248/278.1 |
| 6,619,606 B2 * | 9/2003 | Oddsen et al. ............ 248/282.1 |
| 6,935,883 B2 * | 8/2005 | Oddsen, Jr. ................. 439/374 |
| 7,004,437 B2 * | 2/2006 | Bauer et al. ............... 248/282.1 |
| 7,246,780 B2 * | 7/2007 | Oddsen, Jr. ................. 248/282.1 |
| 7,258,314 B1 | 8/2007 | Parduhn et al. |
| 7,390,110 B2 | 6/2008 | Katz et al. |
| 7,523,912 B1 | 4/2009 | Woods |
| 7,594,631 B1 * | 9/2009 | Carnevali ................... 248/219.4 |
| 7,601,928 B1 | 10/2009 | Magness et al. |
| 7,604,210 B2 * | 10/2009 | Oddsen et al. .......... 248/280.11 |
| 7,673,838 B2 * | 3/2010 | Oddsen et al. ............. 248/278.1 |
| 7,997,546 B1 | 8/2011 | Anderson et al. |
| 8,104,728 B2 * | 1/2012 | Chen ........................ 248/286.1 |
| 8,173,904 B1 | 5/2012 | Parduhn et al. |
| 8,254,092 B2 * | 8/2012 | Russell et al. ........... 361/679.01 |
| 8,310,468 B2 * | 11/2012 | Martin ........................ 345/204 |
| 8,424,822 B2 * | 4/2013 | Suda et al. ................. 248/282.1 |
| 8,469,323 B1 * | 6/2013 | Deros et al. ............... 248/278.1 |
| 8,474,780 B2 | 7/2013 | Parduhn et al. |
| 8,794,579 B2 * | 8/2014 | Sturman et al. ........... 248/284.1 |
| 2004/0217245 A1 * | 11/2004 | Bauer et al. ............... 248/282.1 |
| 2011/0019344 A1 * | 1/2011 | Russell et al. ........... 361/679.01 |
| 2013/0284871 A1 * | 10/2013 | Huang ........................ 248/282.1 |
| 2014/0105670 A1 | 4/2014 | Plomteux |

FOREIGN PATENT DOCUMENTS

| | | | |
|---|---|---|---|
| DE | 4305667 B4 * | 11/2007 |
| DE | 102008058738 | * | 6/2010 |
| GB | 2386053 A * | 9/2003 |
| WO | WO 03087666 A1 * | 10/2003 |

* cited by examiner

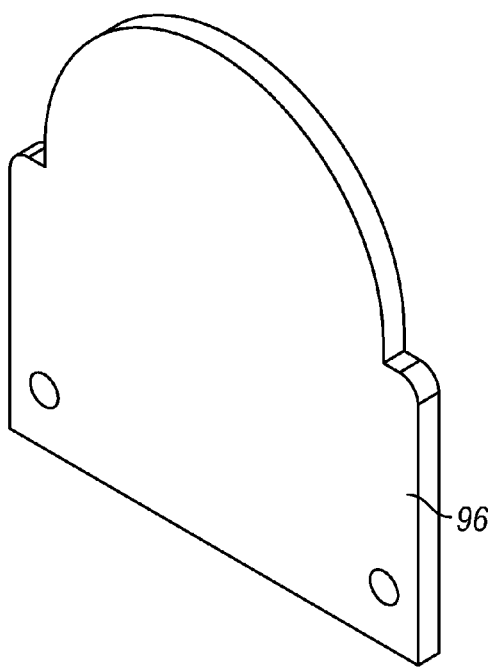
FIG. 18
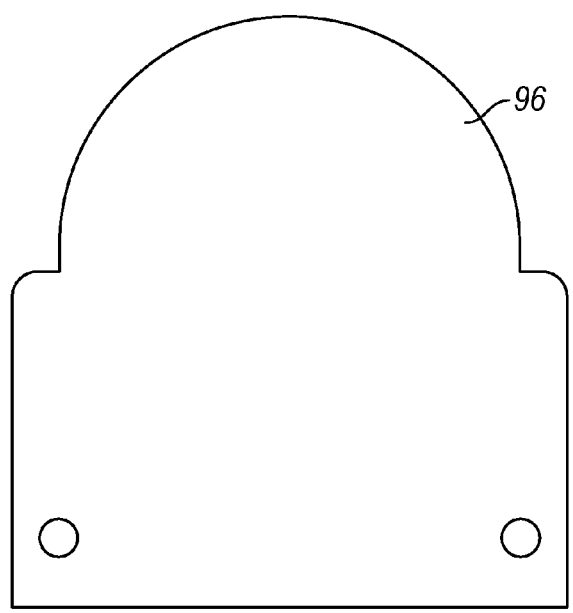 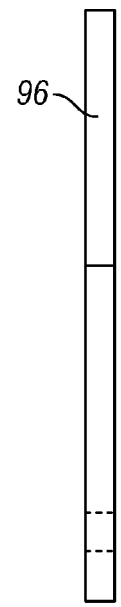
FIG. 19        FIG. 20

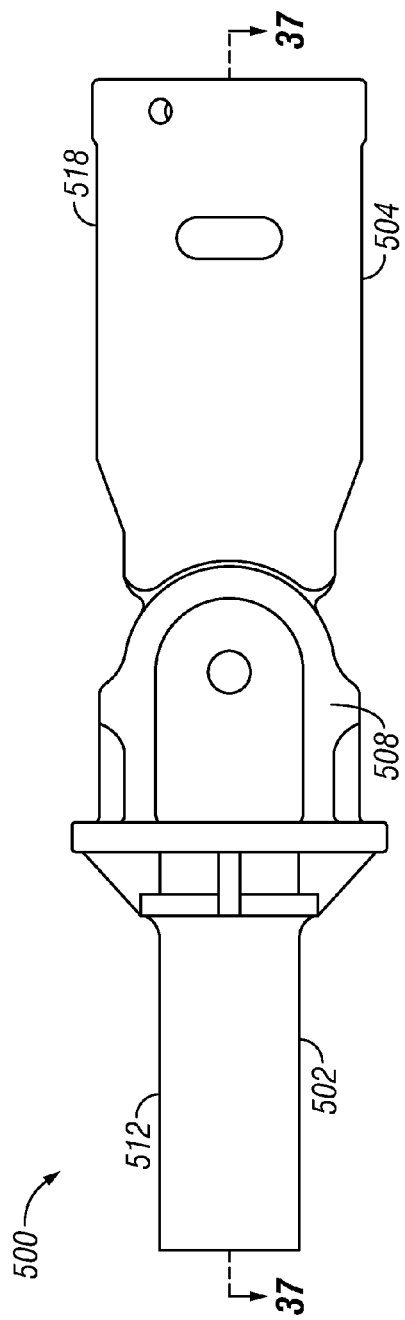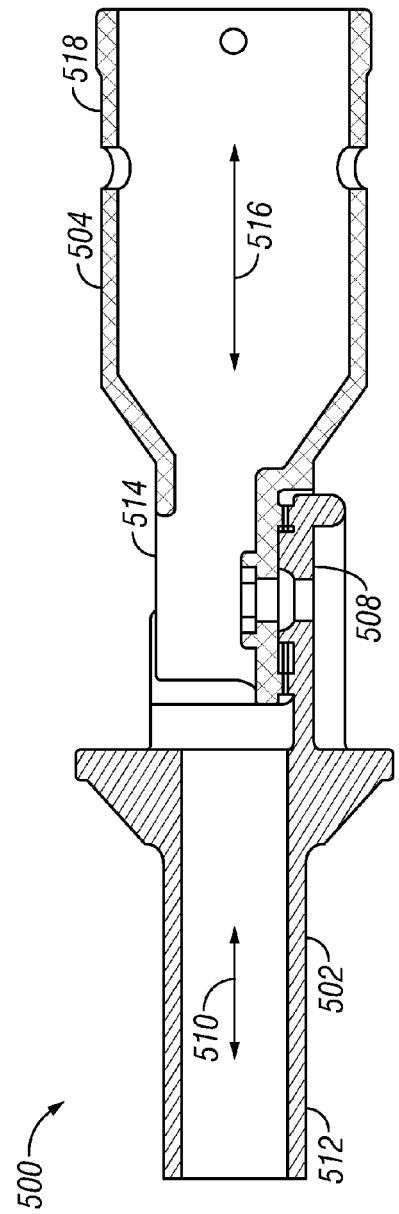

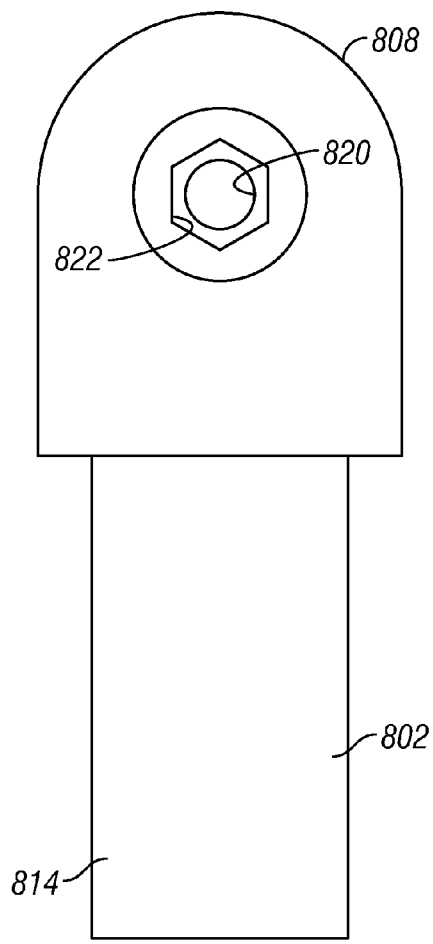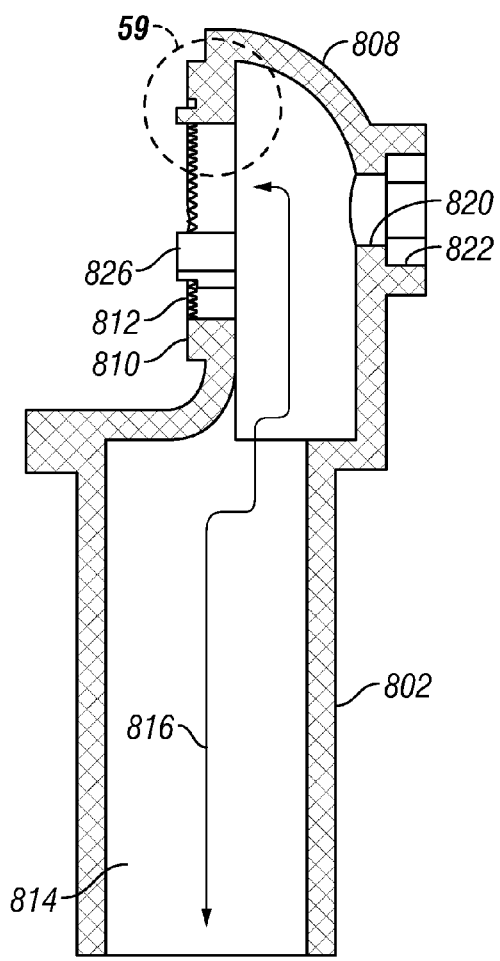
FIG. 56  FIG. 57

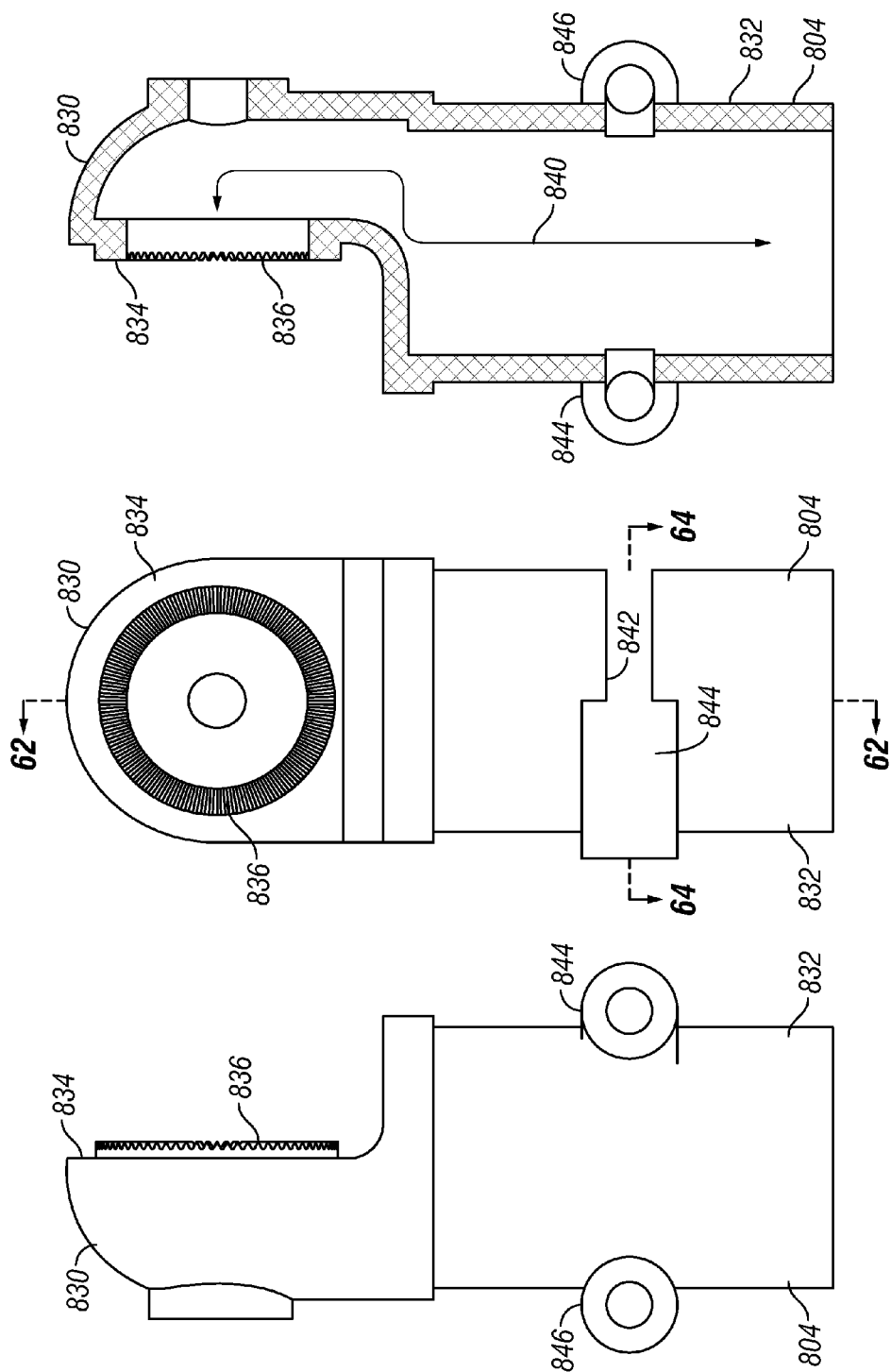

SECURITY LIGHT OR OTHER TRAFFIC CONTROL DEVICE WITH ARTICULATING BRACKET

CROSS-REFERENCE TO RELATED APPLICATIONS

This application claims the benefit of U.S. provisional application No. 61/847,439 entitled "Security Light or Other Traffic Control Device with Articulating Bracket," filed Jul. 17, 2013, and the contents of this application are incorporated herein by reference. This application is a continuation-in-part of U.S. patent application Ser. No. 14/215,008, entitled "Large Capacity Articulating Clamp Assembly," filed Mar. 16, 2014, which claims the benefit of U.S. provisional application No. 61/800,072 entitled "Large Capacity Articulating Bracket," filed Mar. 15, 2013, and the contents of these applications also are incorporated herein by reference.

FIELD OF THE INVENTION

The present invention relates generally to traffic control devices and more particularly to brackets for use with such devices.

BRIEF DESCRIPTION OF THE DRAWINGS

The accompanying drawings, which are incorporated into and form a part of the specification, illustrate one or more embodiments of the present invention and, together with this description, serve to explain the principles of the invention. The drawings merely illustrate preferred embodiments of the invention and are not to be construed as limiting the scope of the invention.

FIG. 18 is a perspective view of the protective cover of the clamping assembly of FIG. 3.

FIG. 19 is a front view of the protective cover.

FIG. 20 is a side view of the protective cover.

FIG. 36 is a side elevational view of a preferred clamp assembly for a supporting a security light, such as the one shown in FIG. 35. The first clamp member is a male tubular fixture sized for engagement in the female tubular fitting on the security light. The second clamp member is a tenon sleeve.

FIG. 37 is a sectional view of the clamp assembly taken along line 37-37 in FIG. 36.

FIG. 56 is a right side elevational view of the first clamp member.

FIG. 57 is a longitudinal sectional view taken along line 57-57 of FIG. 55.

FIG. 60 is a plan view of the second clamp member.

FIG. 61 is a right side elevational view of the second clamp member.

FIG. 62 is a longitudinal sectional view taken along line 62-62 of FIG. 61.

DETAILED DESCRIPTION OF THE PREFERRED EMBODIMENT(S)

Traffic signals and other traffic control devices often are supported from mast arms; the signal is supported in a bracket assembly, often comprising a main support tube, and the bracket is then attached to the mast arm by a clamp assembly. This mounting arrangement has worked well for many years. Prior art devices for supporting traffic devices include those shown and described in U.S. Pat. No. 5,645,255, entitled Articulating Clamp Assembly for Traffic Control device, issued Jul. 8, 1997, U.S. Pat. No. 6,357,709, entitled Bracket Assembly with Split Clamp Member, issued Mar. 19, 2002, and U.S. Pat. No. 4,659,046, entitled Traffic Control Device Mast Arm Bracket, issued Apr. 21, 1987. The contents of these prior patents are incorporated herein by reference.

As traffic control devices become more varied and complex, they require more and larger conductors. Larger conductors tend to be stiffer. Consequently, it is becoming increasing difficult to route the necessary conductors through conventional mounting hardware. The present invention is directed to an improved articulating clamp assembly for mounting traffic control devices. The inventive clamp assembly permits easy routing of larger and/or multiple conductors while maintaining strength and versatility.

Figure 1:
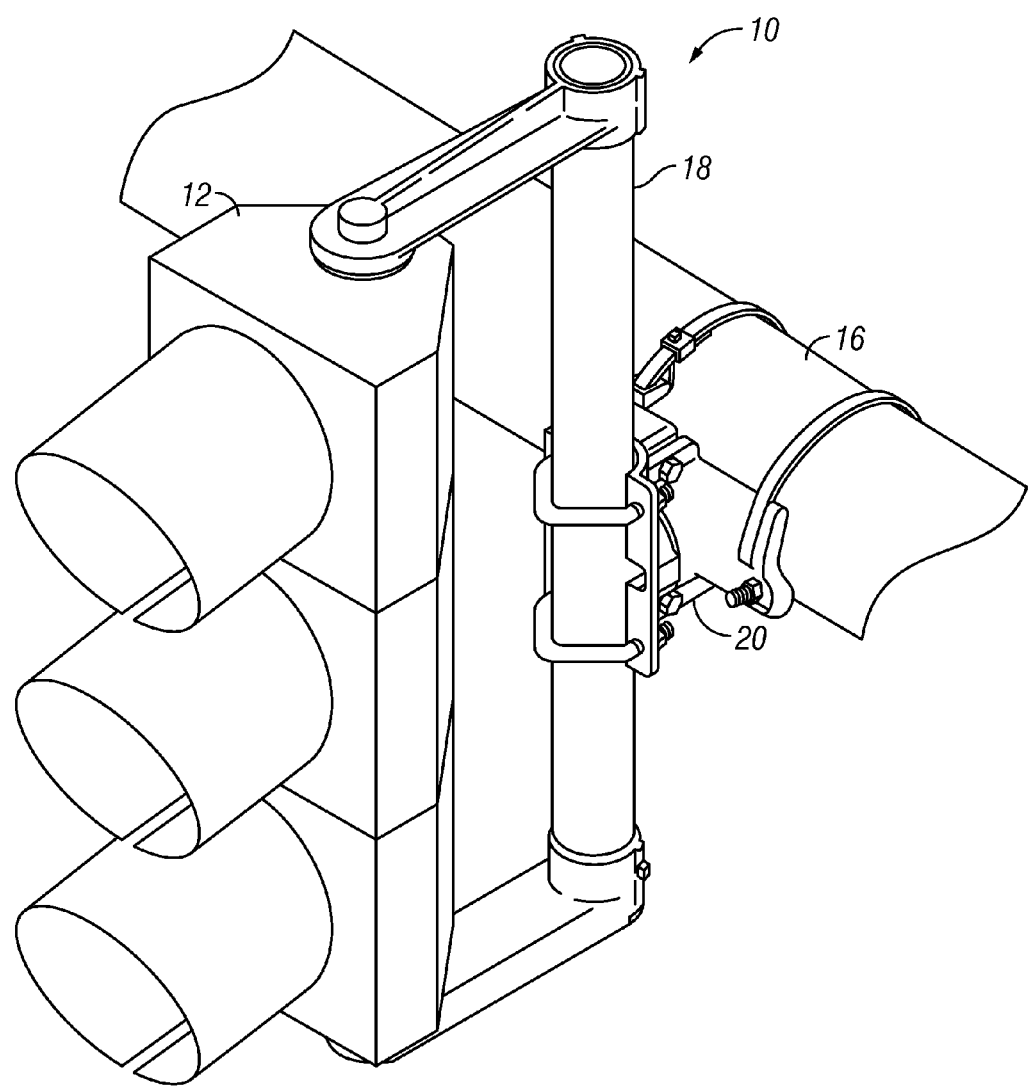
FIG. 1 is a perspective view of a traffic control assembly constructed in accordance with the present invention and including a traffic signal, a bracket supporting the traffic signal, and a clamp assembly attaching the bracket to a mast arm.

Turning now to the drawings in general and to FIG. 1 in particular, there is shown therein a traffic control assembly constructed in accordance with the present invention and designated generally by the reference number 10. The traffic control assembly 10 generally comprises a traffic control device, such as the traffic signal 12. The traffic light 12 is a typical vertical three-light signal. However, as used herein, "traffic control device" refers to any signal, sign, monitor, camera, or other device supported by or over or near a roadway for controlling or monitoring vehicular or pedestrian traffic.

The traffic control assembly 10 further comprises a mounting assembly 14 for supporting the signal 12 on a mast arm 16 or other elongate support structure. The mounting assembly 14 preferably comprises a bracket assembly 18, on which the signal 12 is mounted, and a clamp assembly 20 that attaches the bracket assembly to the mast arm 16.

Figure 2:
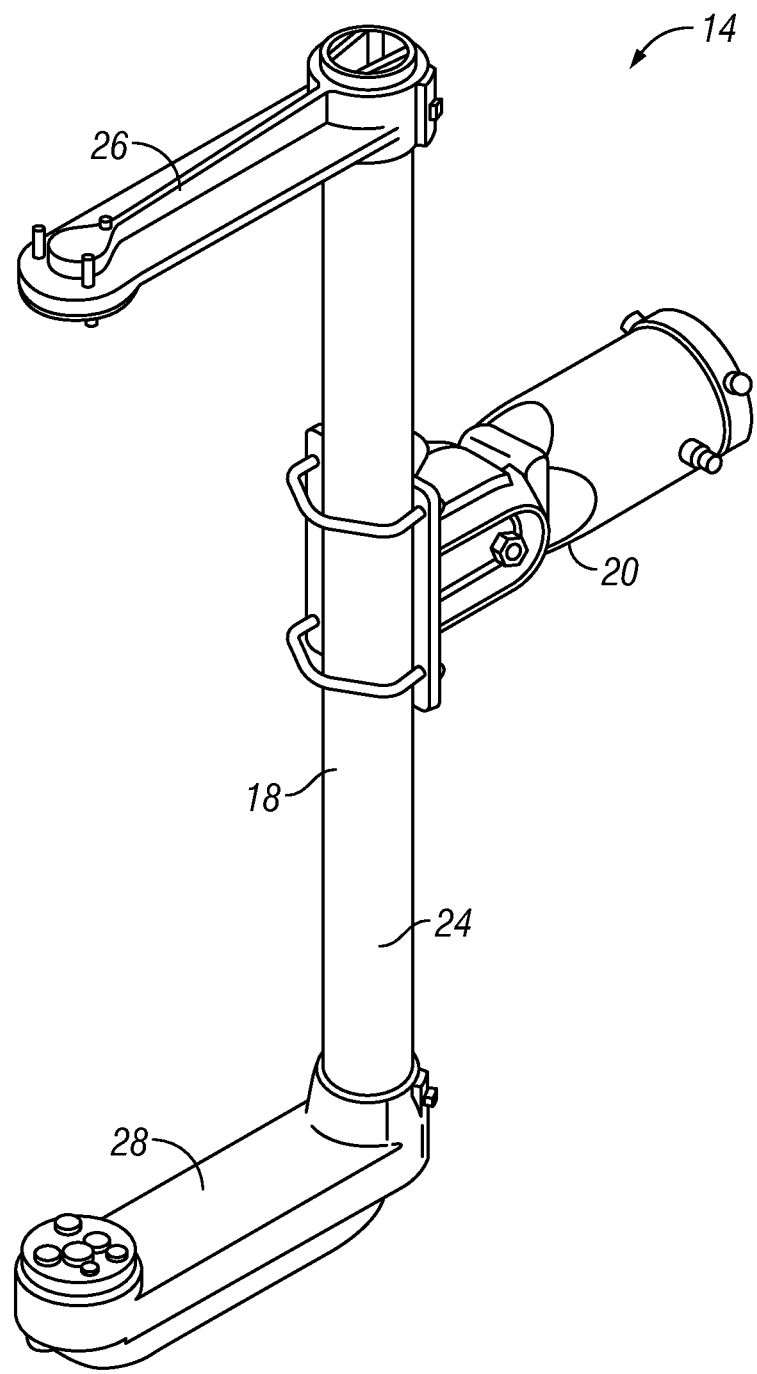
FIG. 2 is a right side perspective view of the mounting assembly of FIG. 1 including the bracket assembly and the clamping assembly.
Figure 3:
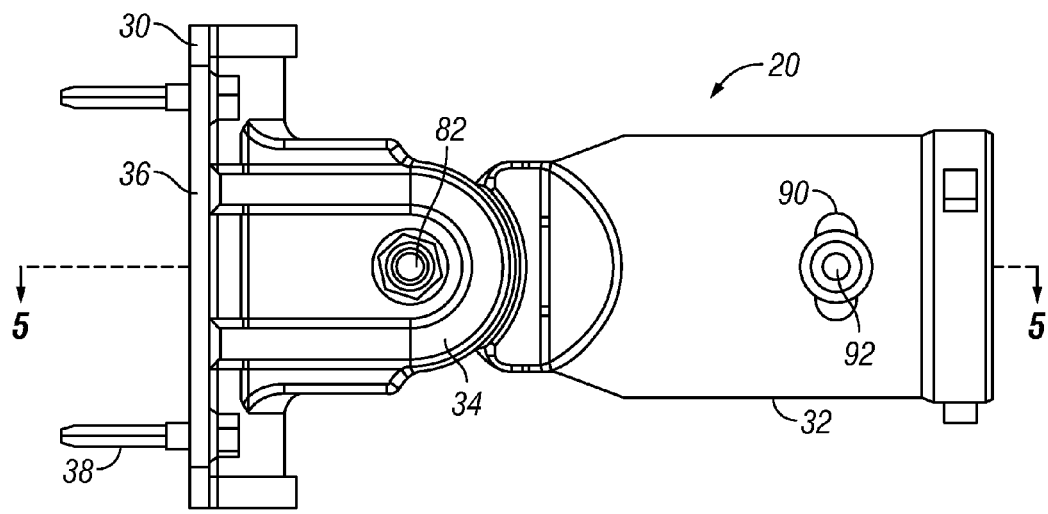
FIG. 3 is a right side elevational view of the clamping assembly shown in FIG. 2.

FIG. 2 illustrates a preferred mounting assembly 14 apart from the signal 12 and mast arm shown only in FIG. 1. The bracket assembly 18 comprises an elongate tubular support 24, an upper arm 26 and a lower arm 28. The clamp assembly 20 shown in FIG. 2 is a tenon mount style, which will be described with reference to FIGS. 3-20.

The assembled clamp assembly 20 is shown in FIGS. 3-7. The clamp assembly 20 comprises a first clamp member 30 and a second clamp member 32. The first clamp member 30 is a saddle style clamp for attaching to the tube 24 of the bracket assembly 18, and the second clamp member 32 includes a tenon sleeve for attachment to the end of a mast arm (not shown) or other tubular extension.

The first clamp member 30, shown separately in FIGS. 8-12, comprises a first end 34 and a second end 36. The second end 36 comprises curved or saddle style plate configured to receive the tube 24 of the bracket assembly 18. U-bolts, designated generally at 38 are included to secure the plate 36 to the tube 24. As best seen in FIGS. 8-12, the first end 34 defines an opening 42, and the second end 36 defines an opening 44. These openings 42 and 44 are connected by an internal channel that forms a substantially straight first conductor path segment 46 extending through the first clamp member 30, the first conductor path segment indicated by the arrow in FIGS. 11 and 12. The first clamp member 30 has a longitudinal axis "$X_1$" shown by the dashed line in FIGS. 11 and 12.

With continuing reference to FIGS. 8-12, the first end 34 of the first clamp member 30 comprises a first joint face 50. The joint face 50 defines a surface for engaging with mating surface on the second clamp member 32 yet to be described. In the preferred embodiment, the first joint face 50 comprises a serrated ring 52 for a purpose that will become apparent. The first end 34 of the first clamp member 30 may also include upper and lower walls 54 and 56 that border the upper and lower edges of the joint face 50 and that partially define the opening 42. The upper and lower walls 54 and 56 may further define a side opening or window 60 spaced a distance from and parallel to the joint face 50.

Referring still to FIGS. 3-7 and turning now also to FIGS. 13-17, the second clamp 32 will be described. The second clamp 32 has a first end 64 and a second end 66. An opening 68 in the first end 64 and an opening 70 in the second end 66 connect an internal channel forming a substantially straight second conductor path segment 72 extending through the second clamp member, as seen best in FIG. 15.

Figure 15:
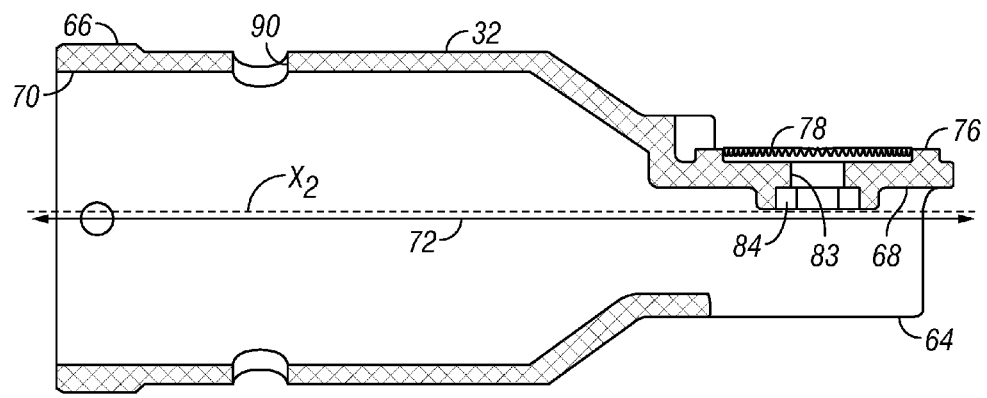
FIG. 15 is a sectional view taken along line 15-15 of FIG. 14.
Figure 16:
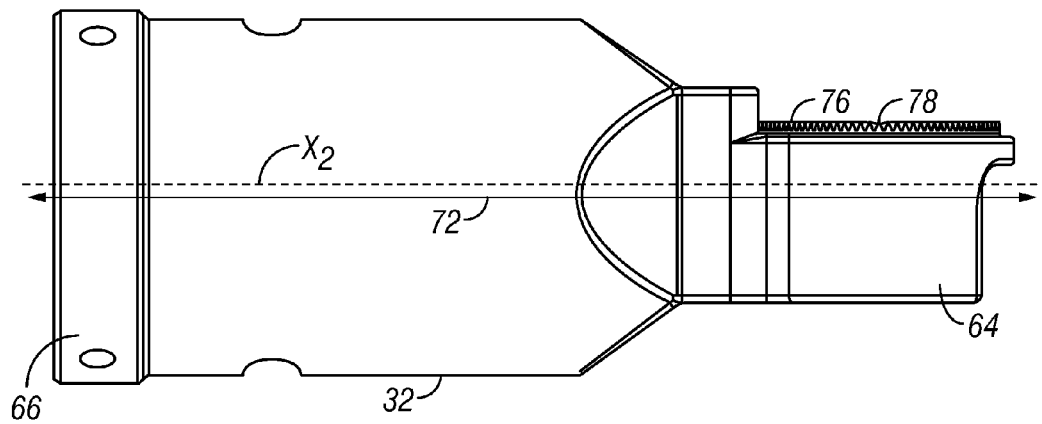
FIG. 16 is a plan view of the tenon sleeve.
Figure 17:
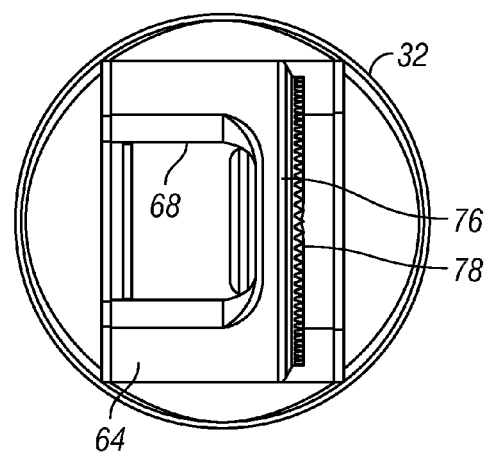
FIG. 17 is an end view of the tenon sleeve.

The second clamp member 32 has a longitudinal axis "X₂" shown by the dashed line in FIGS. 15 and 16.

With continuing reference to FIGS. 13-17, the first end 64 of the second clamp member 32 comprises a second joint face 76. The joint face 76 defines a surface for engaging with the surface 50 on the first clamp member 30. In the preferred embodiment, the second joint face 76 comprises a second serrated ring 78 configured to engage the first serrated ring 52 on the first joint face 50 of the first clamp member 30.

Now it will be apparent that the serrated rings 52 and 78 when engaged with each other form an articulating joint, designated generally at 80 (FIG. 5) that permits the angle of one clamp member to be adjusted relative to the other clamp member. Most preferably, this joint 80, permits one clamp member to be rotated relative to the other clamp member. Thus, once the desired angle is achieved by positioning the joint 80, a bolt 82 is used to secure the joint faces 50 and 76 in the selected position, as best seen in FIG. 5.

As shown in FIG. 15, the bolt hole 83 located centrally in the joint face 76 includes a hexagonal recess 84 sized to non-rotatingly receive the hexagonal head of the bolt 80. This facilitates assembly of the clamp as the nut 85 (FIG. 5) can be threaded on to the bolt 80 using only one tool.

Figure 5:
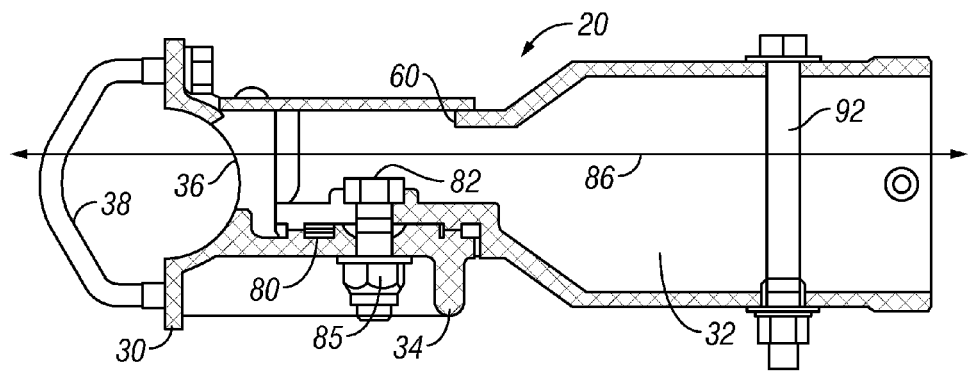
FIG. 5 is a sectional view taken along line 5-5 in FIG. 3.
Figure 6:
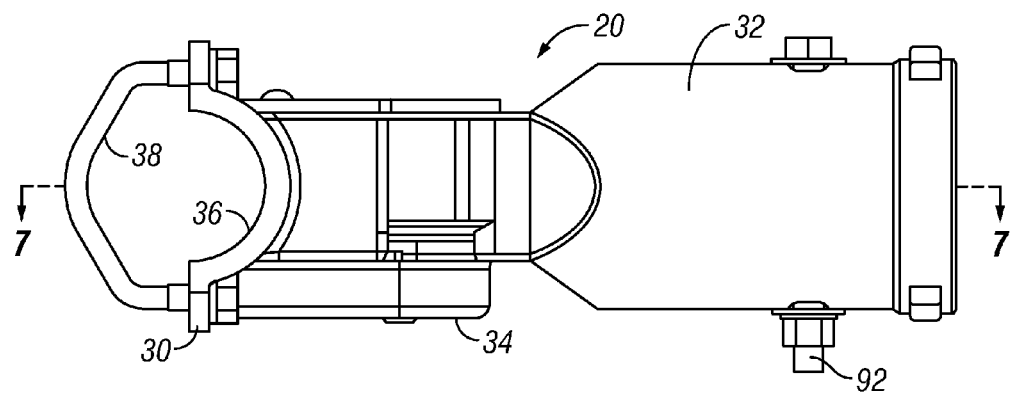
FIG. 6 is a plan view of the clamping assembly of FIG. 3.
Figure 7:
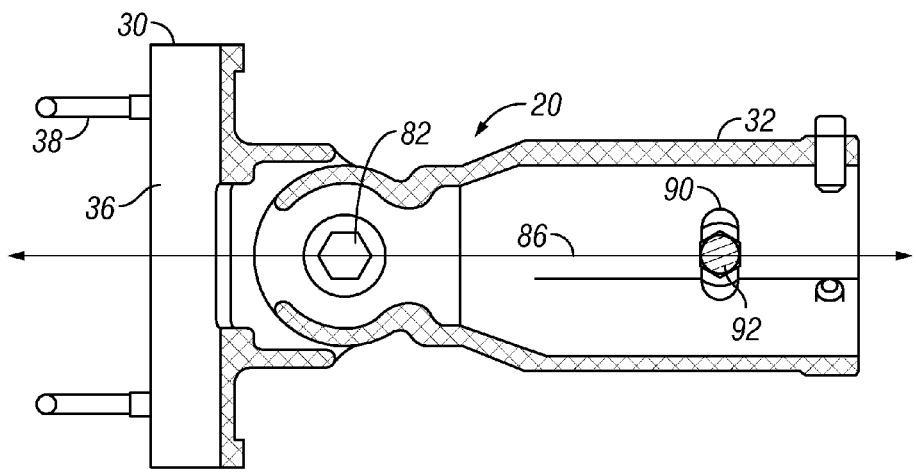
FIG. 7 is a sectional view taken along line 7-7 in FIG. 6.
Figure 8:
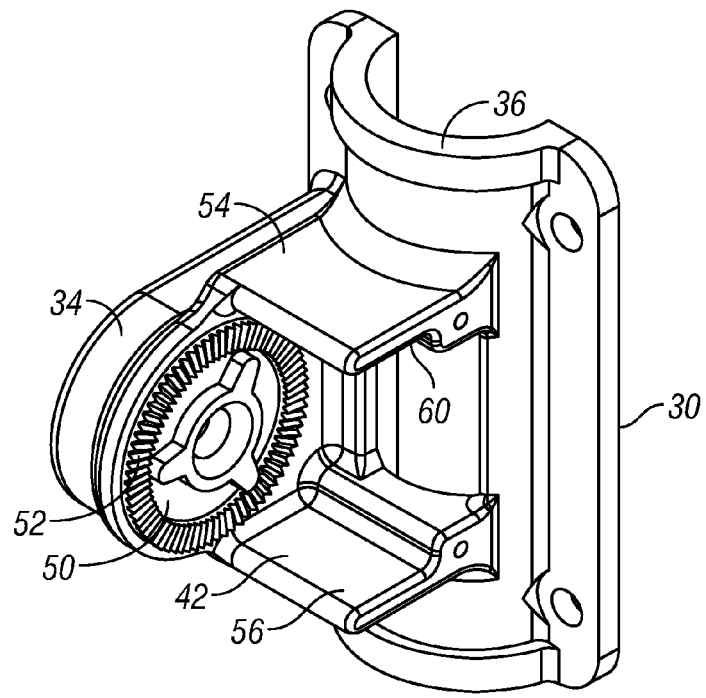
FIG. 8 is a left side perspective view of the tube saddle or first clamp member of the clamping assembly of FIG. 3.
Figure 9:
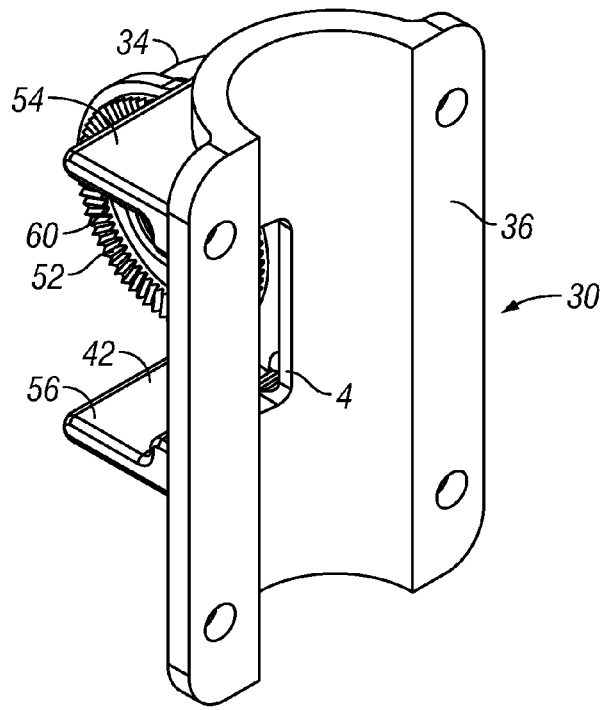
FIG. 9 is a right side perspective view of the tube saddle or first clamp member of the clamping assembly of FIG. 3.
Figure 10:
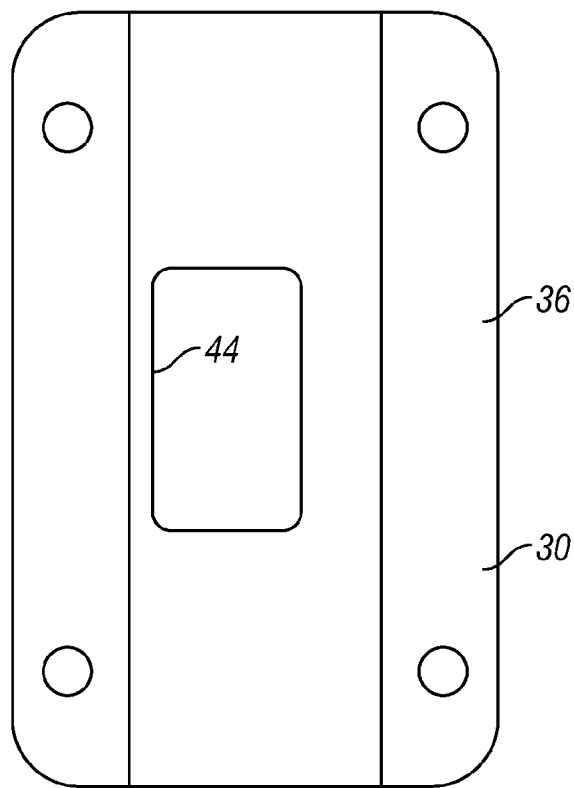
FIG. 10 is a rear view of the first clamp member of the clamping assembly of FIG. 3.
Figure 11:
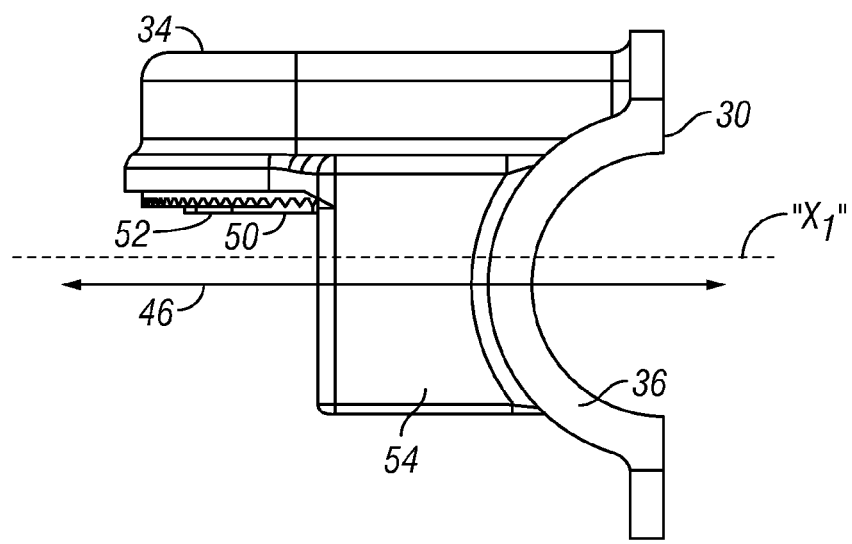
FIG. 11 is a plan view of the first clamp member of the clamping assembly of FIG. 3.
Figure 12:
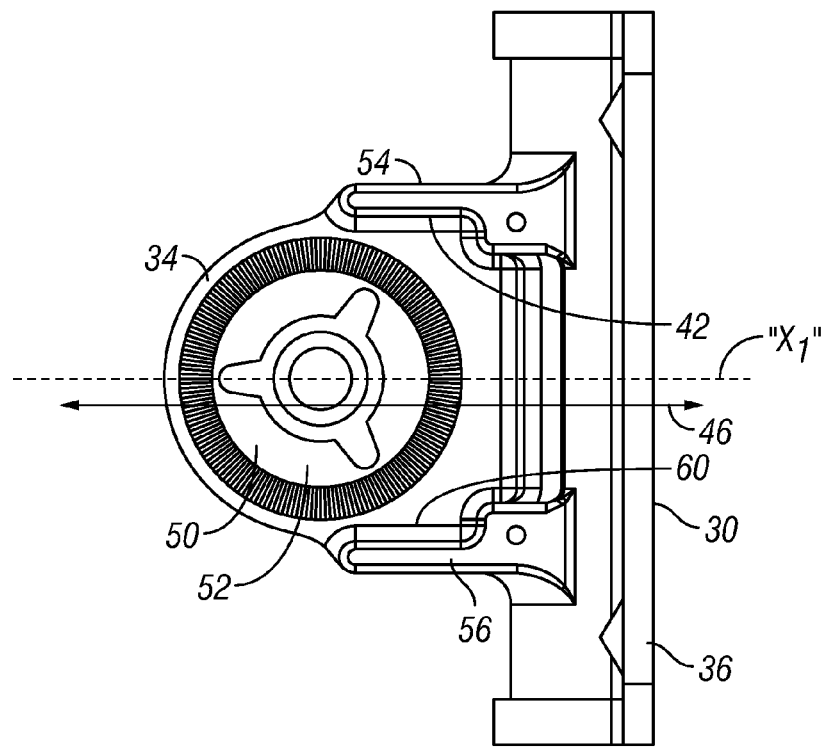
FIG. 12 is a side elevational view of the first clamp member of the clamping assembly of FIG. 3.
Figure 13:
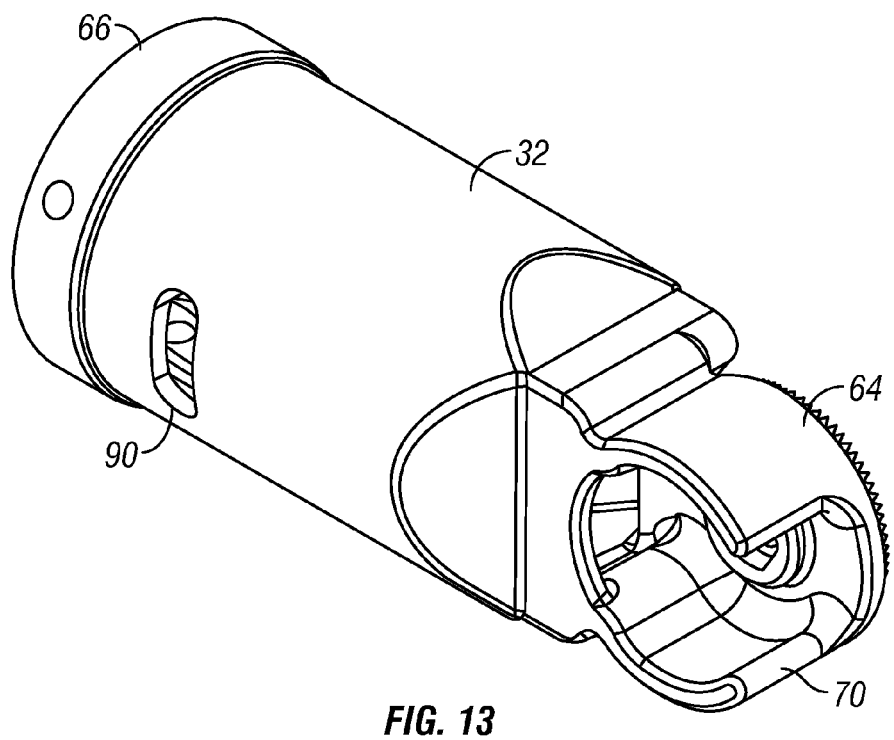
FIG. 13 is a perspective view of the tenon sleeve or second clamp member of the clamping assembly of FIG. 3.
Figure 14:
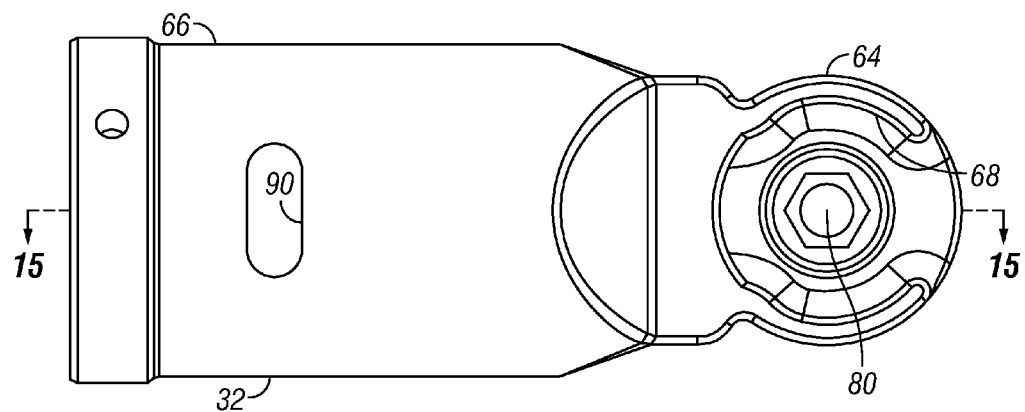
FIG. 14 is left side elevational view of the tenon sleeve.

It will also be noted, as shown in FIGS. 5 and 7, that the joint 80 connects the first end 34 of the first clamp member 30 to the first end 64 of the second clamp member in a manner that connects the first conductor path segment 46 (FIGS. 11 & 12) with the second conductor path segment 72 (FIGS. 15 & 16) to form a complete conductor path 86 extending end-to-end through the clamp assembly 20. It will also be appreciated that this conductor path 86 is substantially straight along its entire length when viewed vertically (FIG. 5) and horizontally (FIG. 7) when the longitudinal axes X₁ and X₂ of the first and second clamp members 30 and 32 are parallel, and shown herein.

Now it will also be appreciated the first and second clamp members 30 and 32 are formed so that the joint 80 formed by the abutting joint faces 50 and 75 is offset, that is, positioned to one side of the conductor path 86. Still further, it will be noted that the bolt 82 is only long enough to secure the abutting joint faces 50 and 75 and that the bolt does not extend transversely across the conductor path 86. This allows the conductor to be fed directly through the assembled clamp assembly 20 without navigating around a through bolt at the joint.

Returning to FIGS. 13-17, the second end 66 of the second clamp 32 forms a tenon sleeve that is fittable on the end of a mast arm (not shown). In a known manner, the sleeve includes a slot 90 and a bolt 92 (FIGS. 3-7) for securing the tenon sleeve in position on the mast arm. During installation the conductor will easily pass around the bolt 92 because the relatively large diameter of the tenon sleeve and mast arm.

Figure 4:
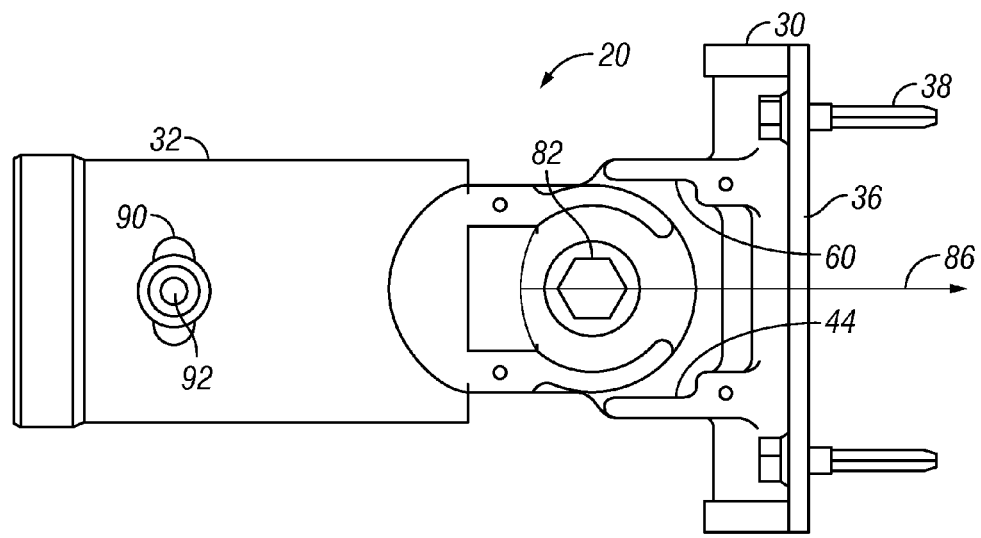
FIG. 4 is a left side elevational view of the clamping assembly shown in FIG. 3.

As shown in FIGS. 4 and 5, when the first and second clamp member 30 and 32 are bolted together at the joint 80, the window 60 provides side access to the conductor path 86 and the bolt 82. A protective cover 96, shown in detail in FIGS. 18-20, may be included to cover this opening.

Figure 22:
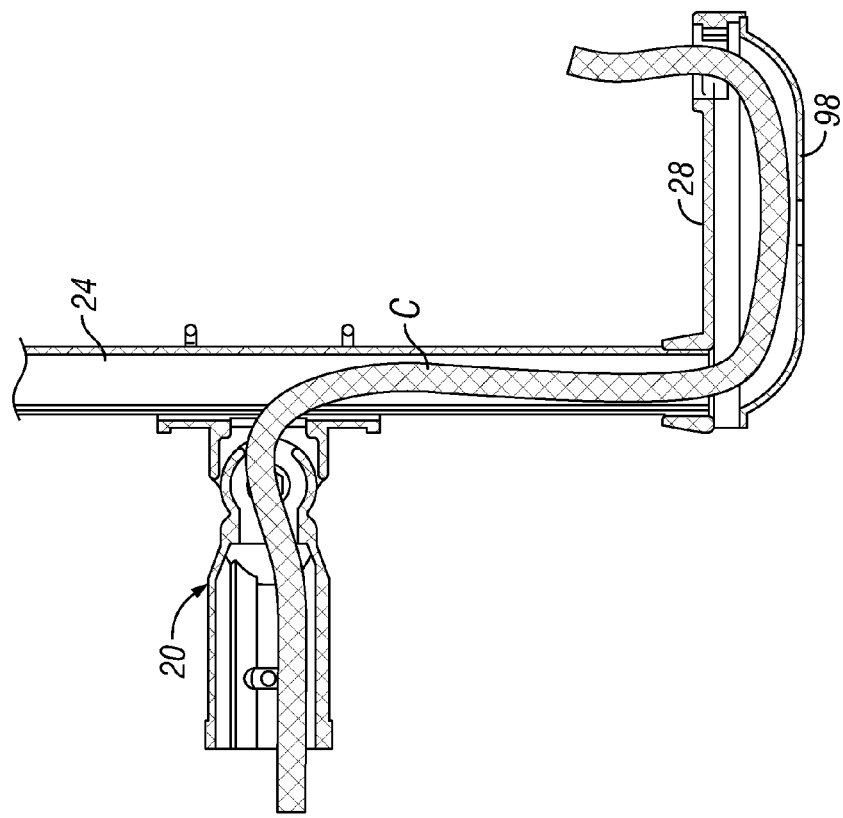
FIG. 22 is a sectional view of the tenon mount embodiment of the inventive mounting assembly showing the path of the larger conductor passing therethrough.
Figure 21:
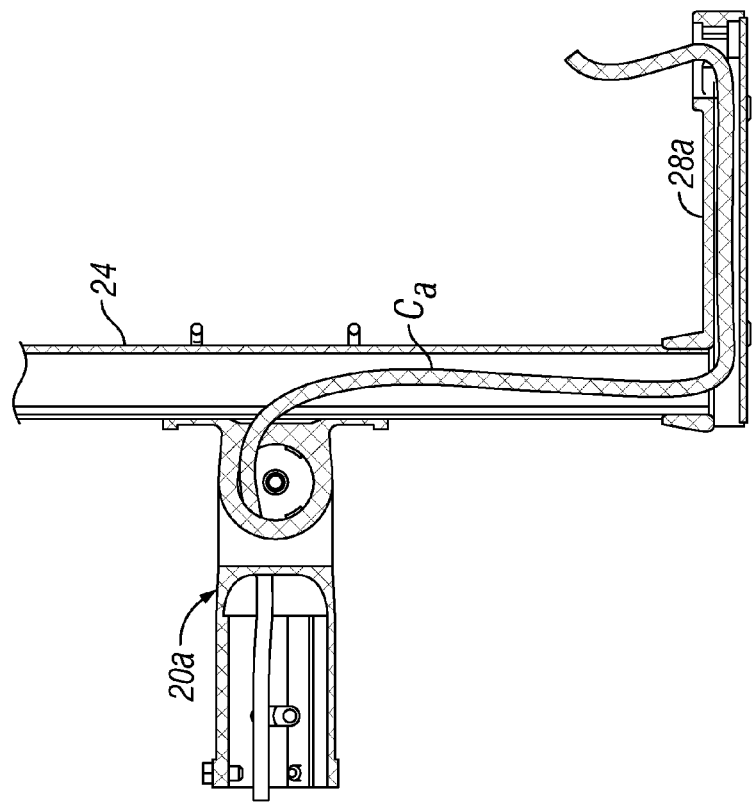
FIG. 21 is a vertical sectional view of prior art mounting assembly showing the path of a conductor passing therethrough.
Figure 21A:
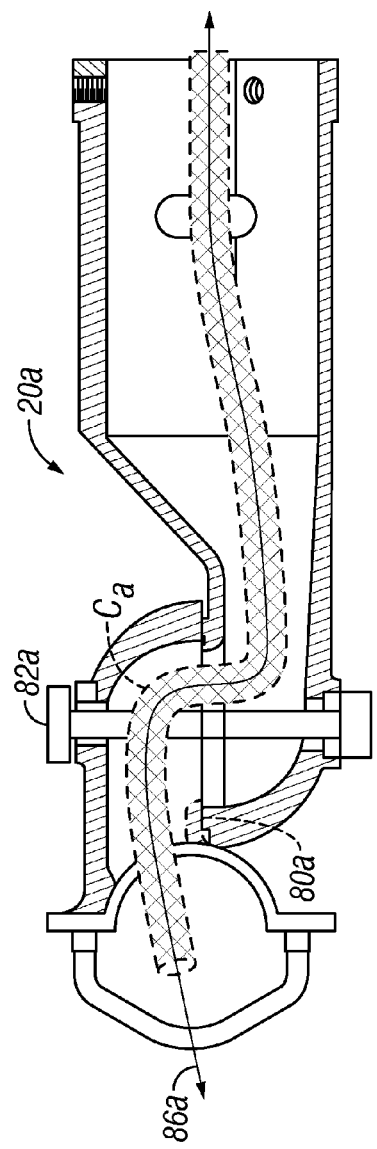
FIG. 21A is horizontal sectional view of the prior art clamp assembly showing the horizontal S-shaped path of the conductor as it passes through the adjoined ends members of the clamp assembly.
Figure 22A:
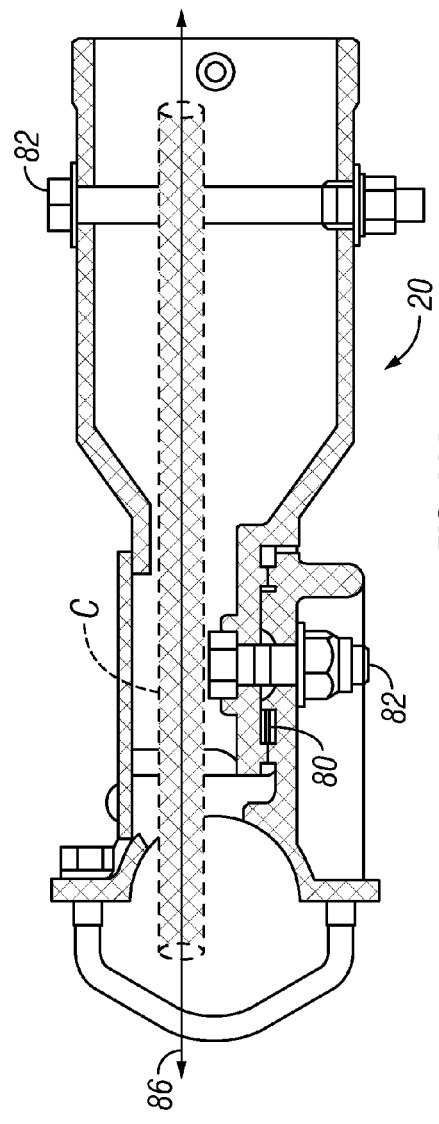
FIG. 22A is horizontal sectional view showing the generally straight path the conductor follows through the adjoined ends members of the inventive clamp assembly.
Figure 23:
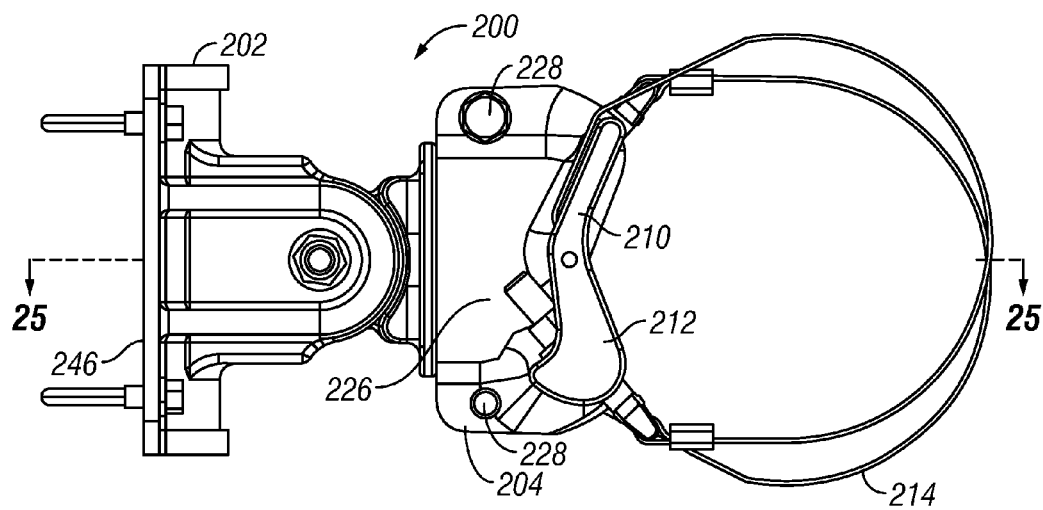
FIG. 23 is a right side elevational view of a second embodiment of the inventive clamping assembly comprising a band mount as the second clamp instead of a tenon sleeve.
Figure 24:
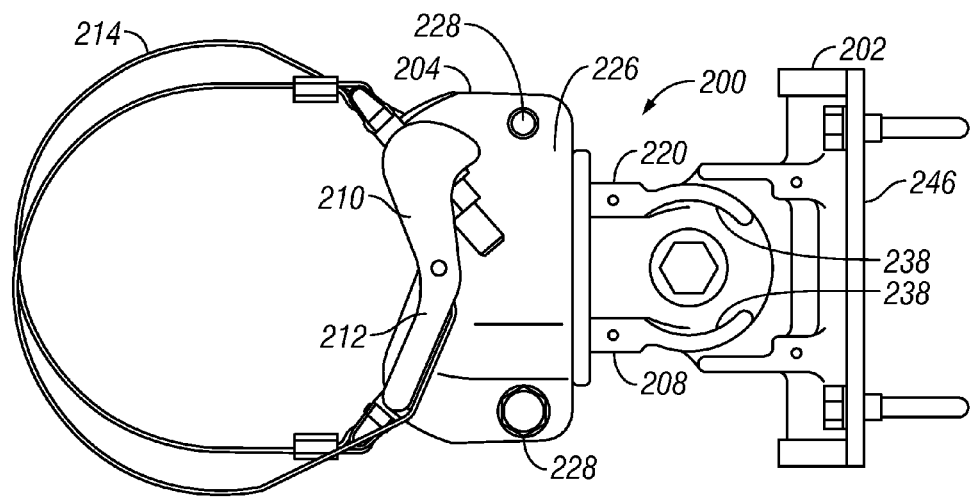
FIG. 24 is a left side elevational view of the band mount clamping assembly of FIG. 23.
Figure 25:
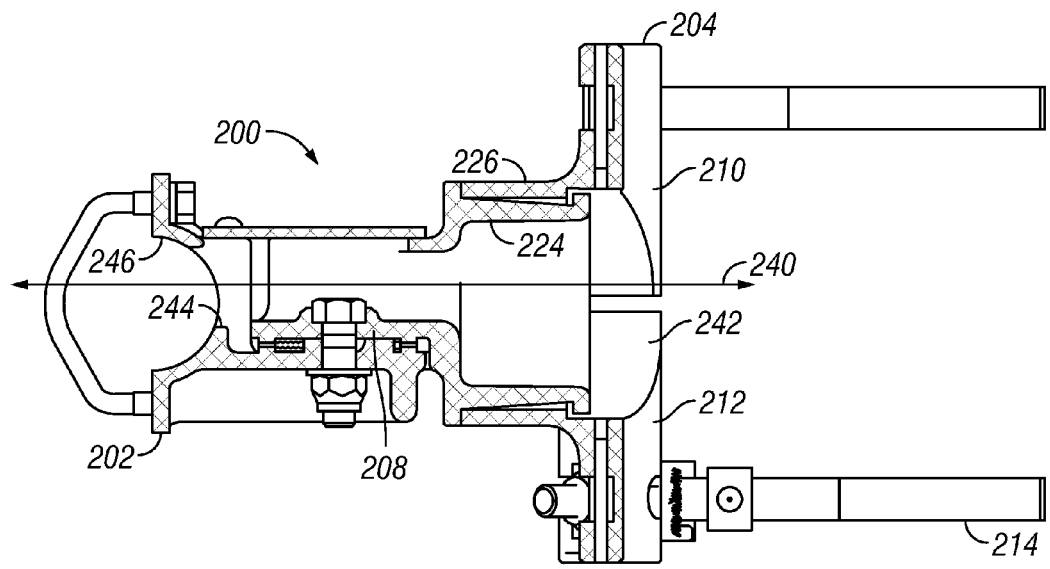
FIG. 25 is a sectional view taken along line 25-25 of FIG. 23.
Figure 26:
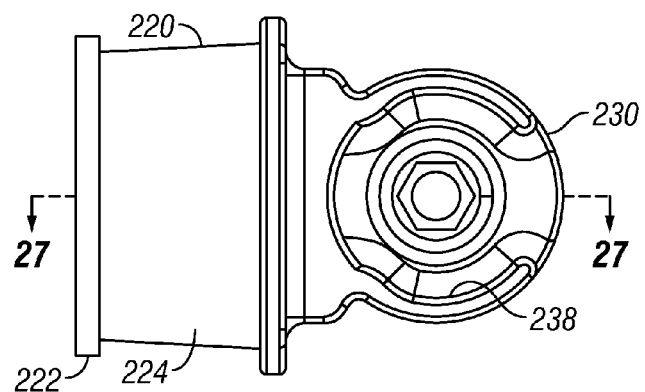
FIG. 26 is a left side elevational view of the articulating end member of the band mount style clamping assembly of FIG. 23.
Figure 27:
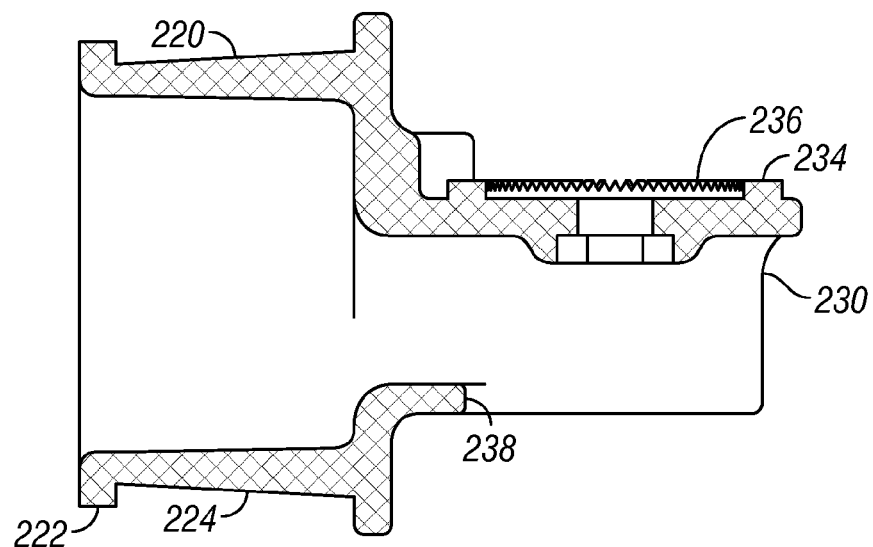
FIG. 27 is a sectional view of the end member taken along line 27-27 of FIG. 26.
Figure 28:
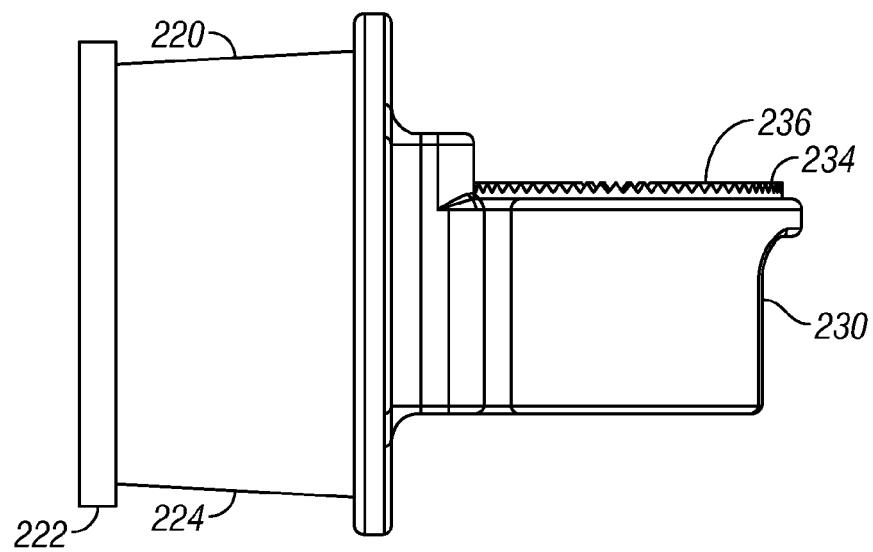
FIG. 28 is a plan view of the end member of the band mount style clamping assembly of FIG. 23.
Figure 29:
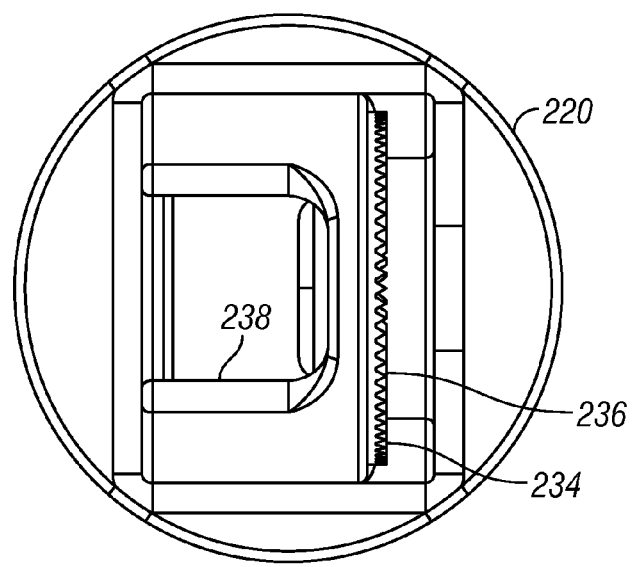
FIG. 29 is an end view of the end member of the band mount style clamping assembly of FIG. 23.
Figure 30:
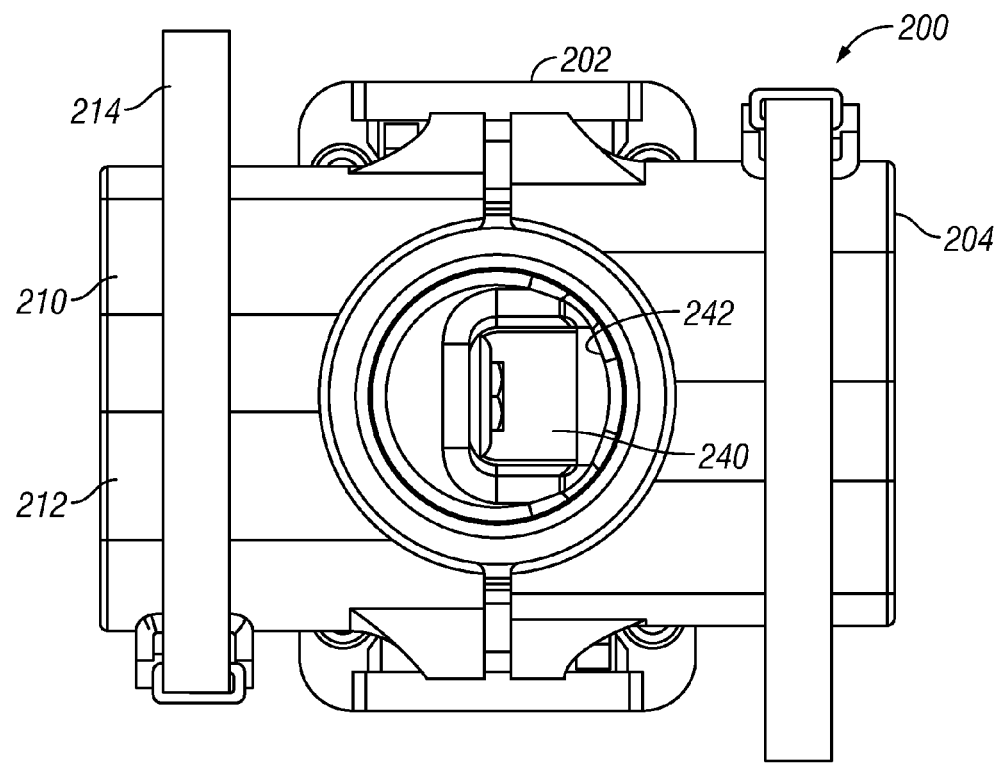
FIG. 30 is a mast arm end view of the assembled clamping assembly of FIG. 23.
Figure 31:
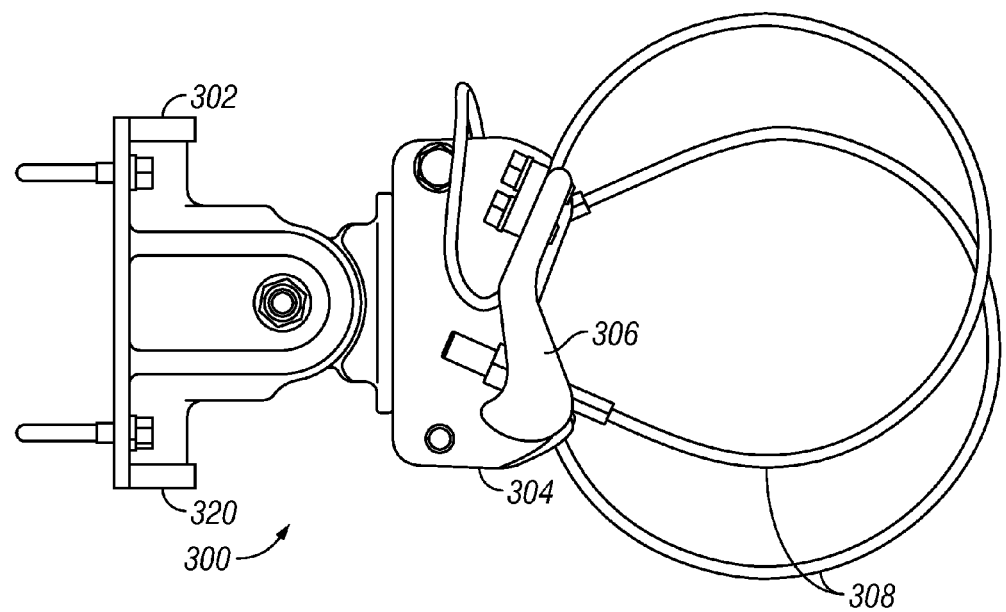
FIG. 31 is a right side elevational view of a third embodiment of the inventive clamping assembly comprising a cable mount as the second clamp instead of a tenon sleeve.
Figure 32:
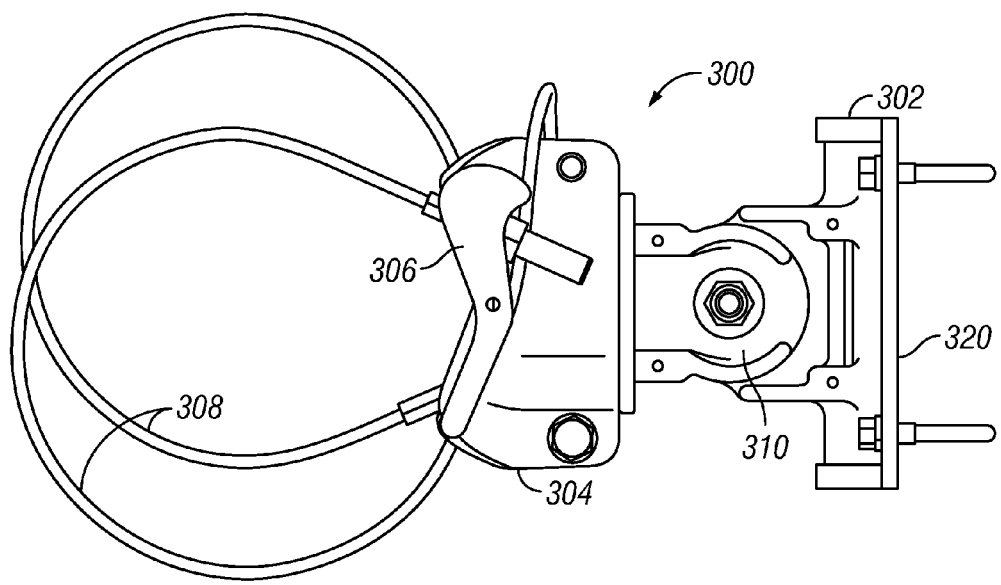
FIG. 32 is a left side elevational view of the cable mount clamping assembly of FIG. 31.
Figure 33:
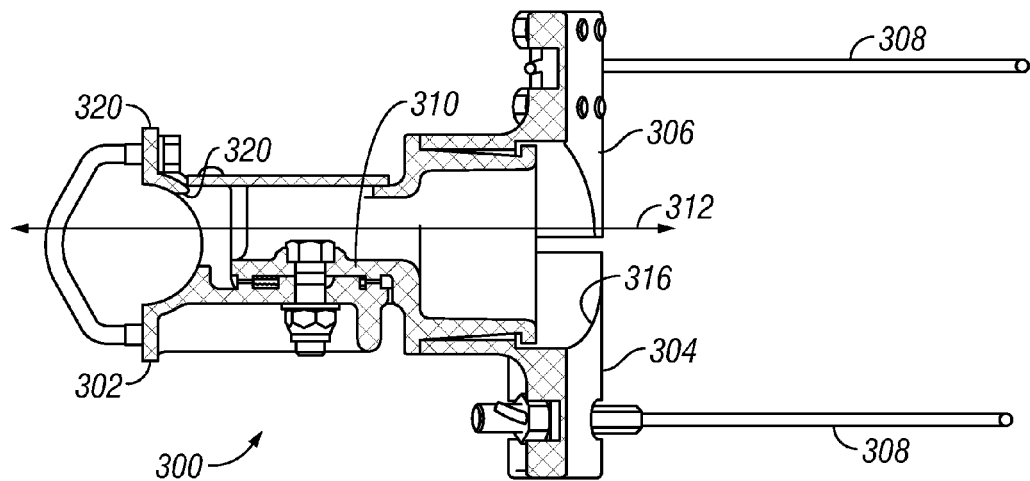
FIG. 33 is a sectional view taken along line 33-33 of FIG. 31.
Figure 34:
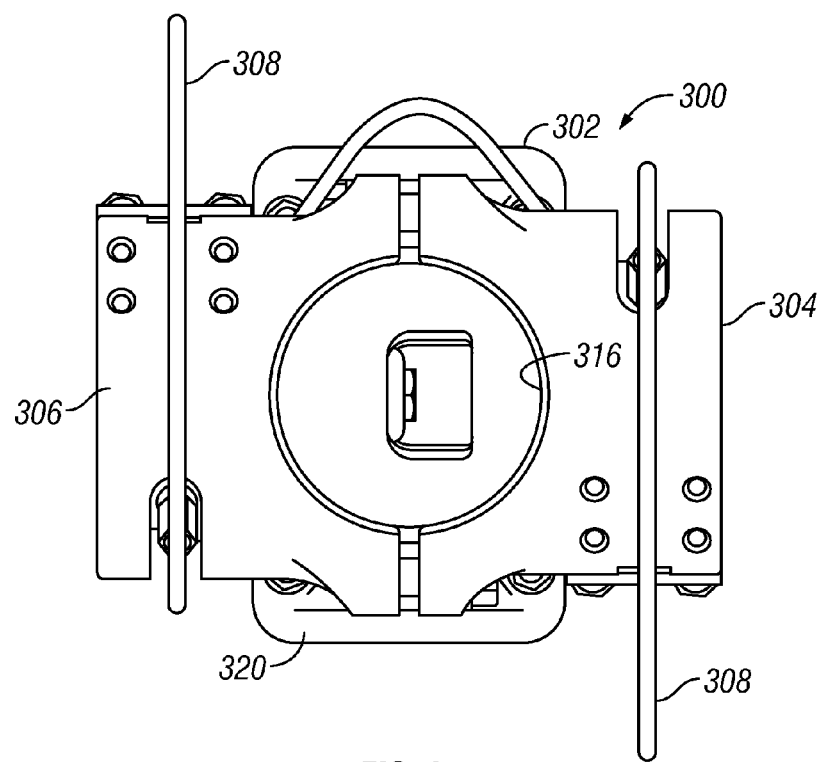
FIG. 34 is a mast arm end view of the assembled clamping assembly of FIG. 31.

The advantages of the inventive clamp assembly 20 as compared to the prior art clamp assembly 20a are illustrated in FIGS. 21, 21A, 22, and 22A. As previously described and as is shown in FIGS. 22 and 22A, in the inventive clamp assembly, a larger conductor, such as a five-eighths inch conductor "C" follows a relatively straight path through the clamp assembly 20 to the tube 24. The smaller conductor $C_a$ must follow an S-shaped conductor path 86a (FIG. 21A) as it passes through the conductor path $86_a$ of the prior art clamp assembly 20a.

Referring still to FIG. 22, another feature of the bracket assembly 18 of the present invention will be explained. An enlarged and deeper protective cover 98 is provided on the lower arm 28 of the bracket assembly 18. As illustrated in FIG. 22, this deeper profile allows the larger conductor C to make wider turns as it negotiates the path through the bracket 18.

The above described embodiment of FIGS. 2-22A illustrates a clamp assembly with a tenon style mount for the mast arm. However, the present invention may, of course, be provided with different style mounts. Another common style of mast arm mount is a saddle plate with band connectors so that the clamp assembly is fittable on the side of the mast arm. FIGS. 23-30 illustrate the inventive clamp assembly with a band style saddle mount designated generally by the reference number 200.

The clamp assembly 200 comprises a first clamp member 202 and a second clamp member 204. The first clamp member 202 is similar to the first clamp member 30 in the previously described embodiment and will not be described in detail. The second clamp member 204 has a first end 208 and a second end 210. The second end 210 comprises a saddle plate 212 with band connectors 214 for securing the plate to the side of the mast arm (not shown). In this preferred embodiment, the first end 208 of the second clamp member 204 is a connector head 220, shown in more detail in FIGS. 26-29. The rear end 222 of the connector head 220 has a neck 224 rotatably receivable in a collar 226 formed on the front of the plate 212. See FIG. 25. The connector head 220 is secured in the desired rotational position by one or more bolts 228, depending on whether the saddle plate 212 is one part or two parts.

The front end 230 of the connector head 220 is similar to the first end of the second clamp 32 previously described. The front end 230 defines a joint face 234 with a serrated ring 236 and forms an access window 238 similar to the first end 34 of the first clamp member 30 in the previous embodiment. In other respects the clamp assembly 200 functions similarly to the tenon-style clamp assembly previously described. The assembly clamp assembly 200 defines similarly straight conductor path 240 extending the length of the assembly from the opening 242 (FIG. 30) in the saddle plate 212 to the opening 244 in the saddle plate 246 in the first clamp 202.

Another common style of mast arm connector is a cable-mount. A clamp assembly 300, shown in FIGS. 31-34, illustrates this type of mount incorporated in the clamp assembly of the present invention. The clamp assembly 300 comprises a first clamp member 302, like the clamp members 30 and 202 of the previously described embodiments. The clamp assembly 300 further comprises a second clamp member 304, which has a saddle plate 306 similar to the plate 212 of the previous band-style assembly 200. However, instead of the bands 214, the second clamp member 304 employs cables 308 in a known manner to attach the plate 306 to the mast arm (not shown). The second clamp member 304 includes a connector head 310 similar to the connector head 220 of the band-style assembly described above. As in the previous embodiments, the clamp assembly 300 provides a substantially straight conductor path 312 that extends end-to-end through the assembly, as indicated by the arrow 312 in FIG. 33, from the opening 316 in the saddle plate 306 in the second clamp 304 to the opening 318 in the saddle plate 320 in the first clamp 302.

Now it will be appreciated that the clamp assembly, bracket assembly, mounting assembly and traffic control assembly of the present invention provides significant advantages in installation of traffic devices. The straight path through the clamp assembly facilitates the placement of the conductors during installation of the device. Additionally, the deeper arm cover on the bracket arm reduces the sharpness of the turns required when threading the conductor through the bracket.

Figure 35:
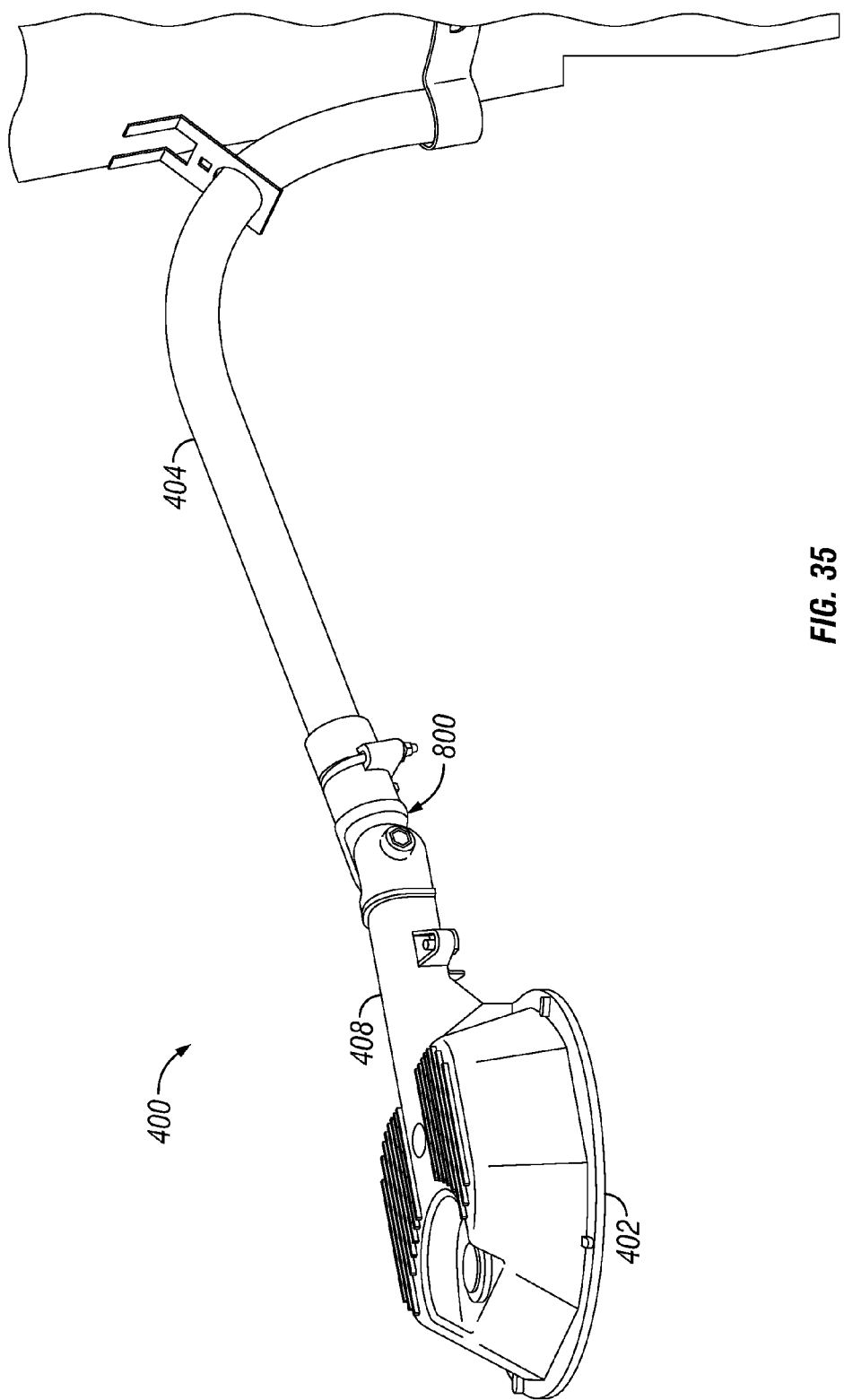
FIG. 35 is a perspective view of a traffic control assembly constructed in accordance with another embodiment of the present invention. The traffic control device in this embodiment is a security light. The mounting assembly includes a female tubular fitting extending from the security light and a clamp assembly attaching the light and fitting to a support arm.
Figure 38:
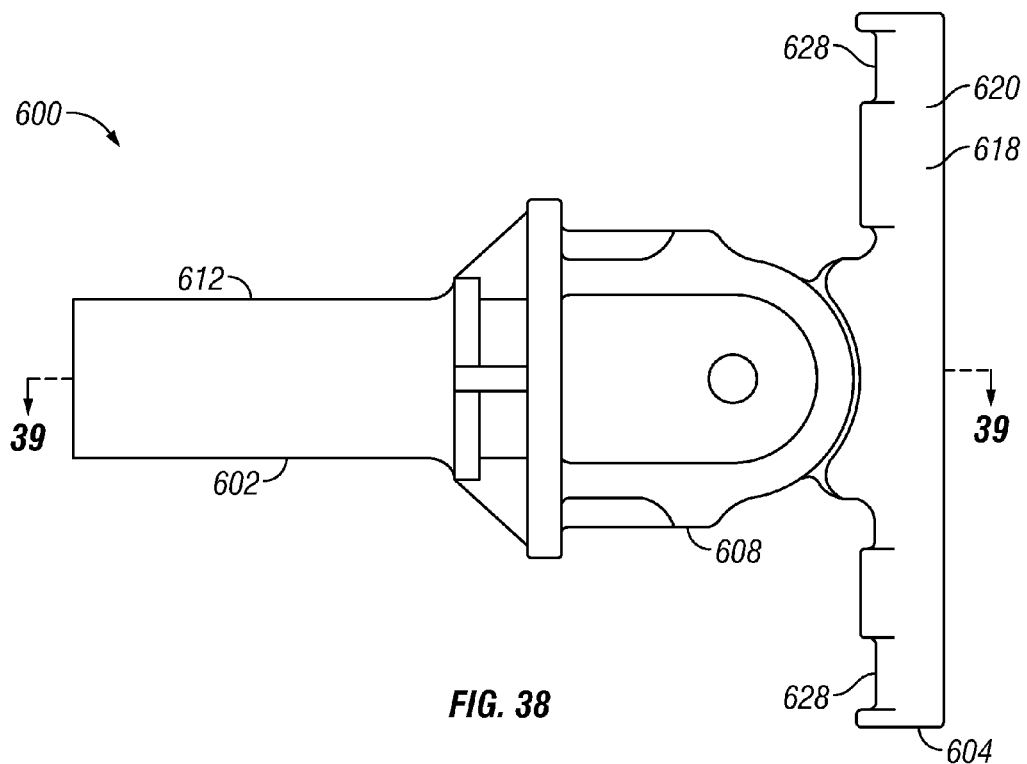
FIG. 38 is a side elevational view of a clamp assembly in which the second clamp member is a wall plate.
Figure 39:
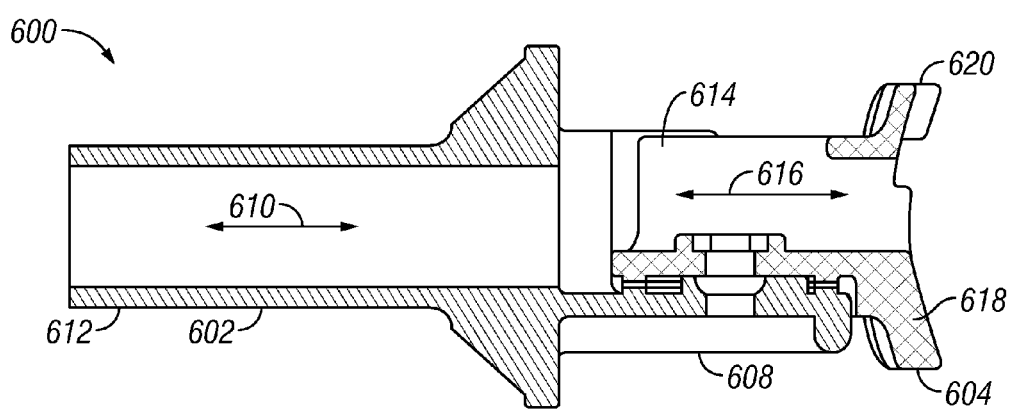
FIG. 39 is a sectional view of the clamp assembly taken along line 39-39 in FIG. 38.
Figure 40:
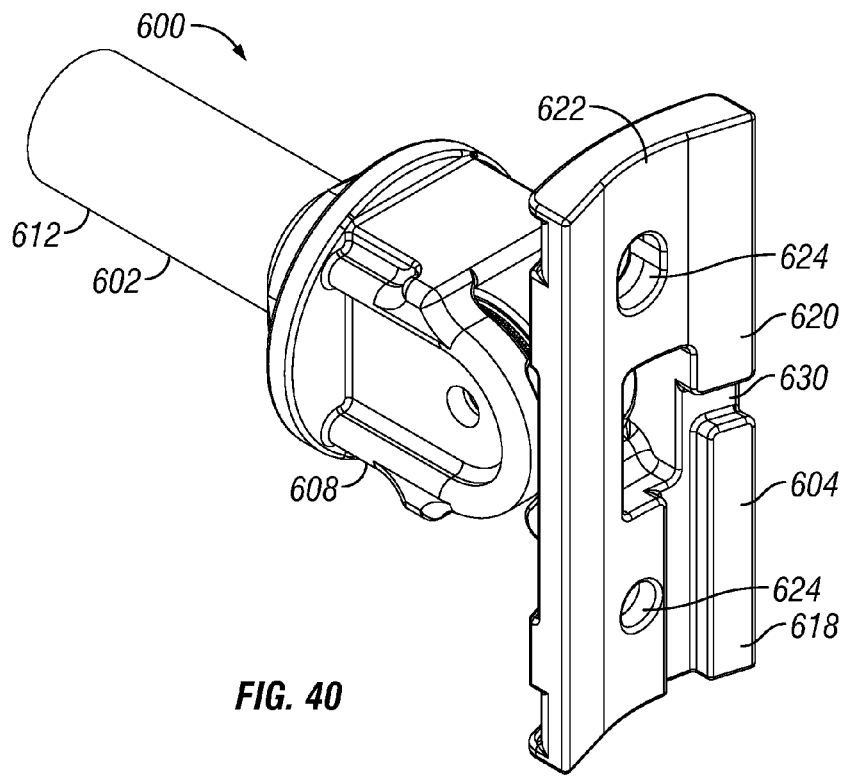
FIG. 40 is a left side perspective view of the clamp assembly in which the second clamp member is a wall plate.
Figure 41:
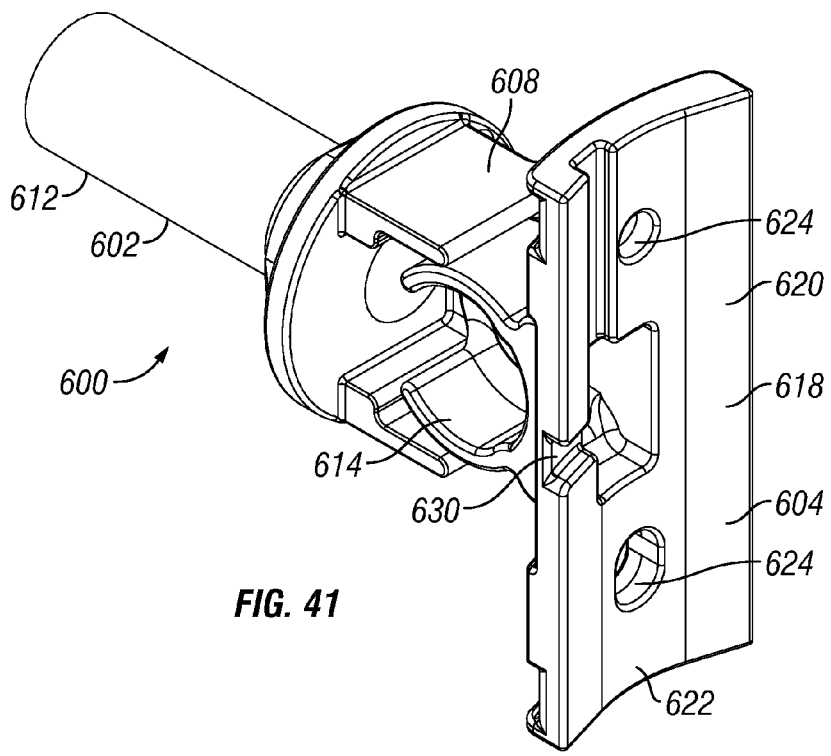
FIG. 41 is a right side perspective view of the clamp assembly in which the second clamp member is a wall plate.
Figure 42:
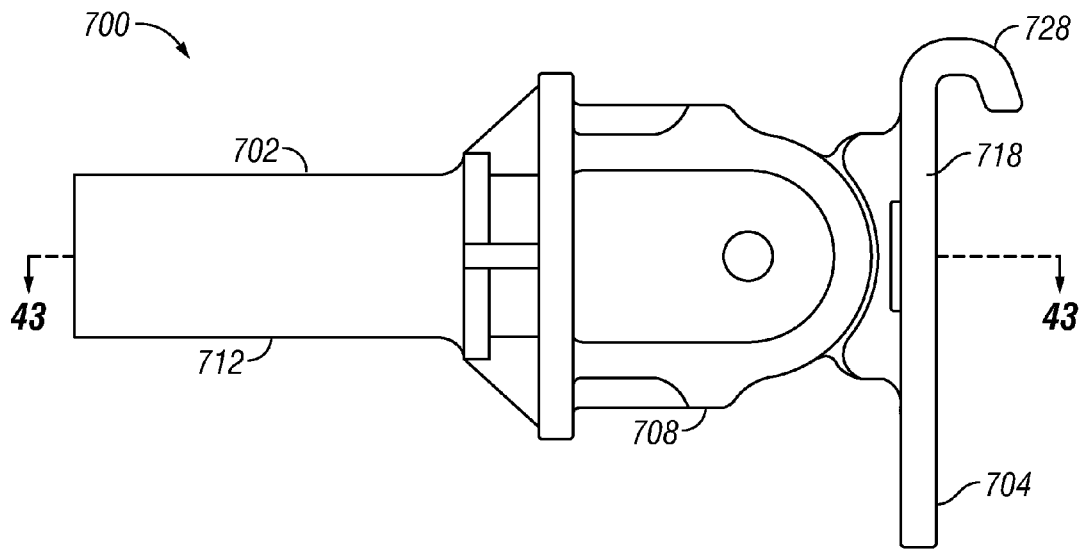
FIG. 42 is a side elevational view of a clamp assembly in which the second clamp member is a simplex fixture.
Figure 43:
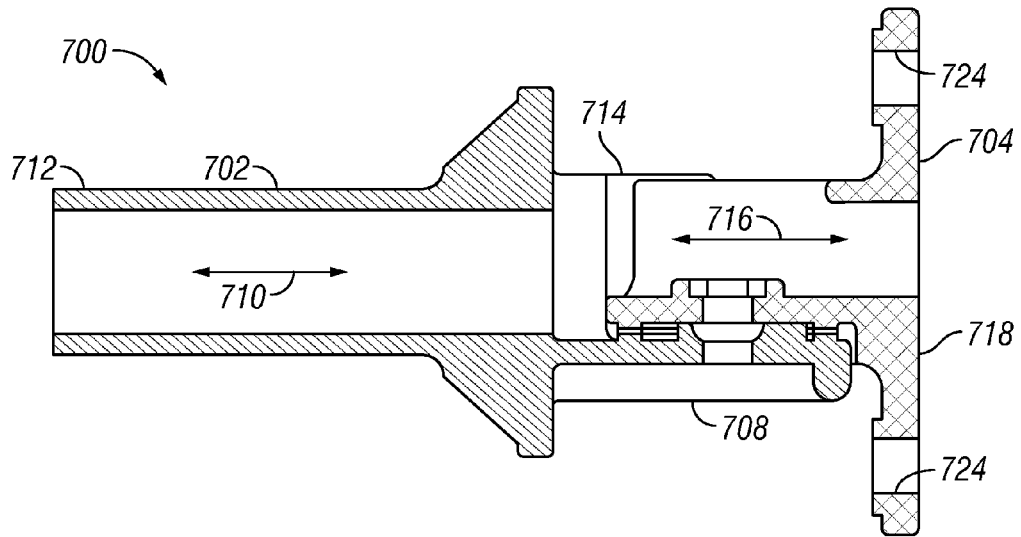
FIG. 43 is a sectional view of the clamp assembly taken along line 43-43 in FIG. 40.
Figure 44:
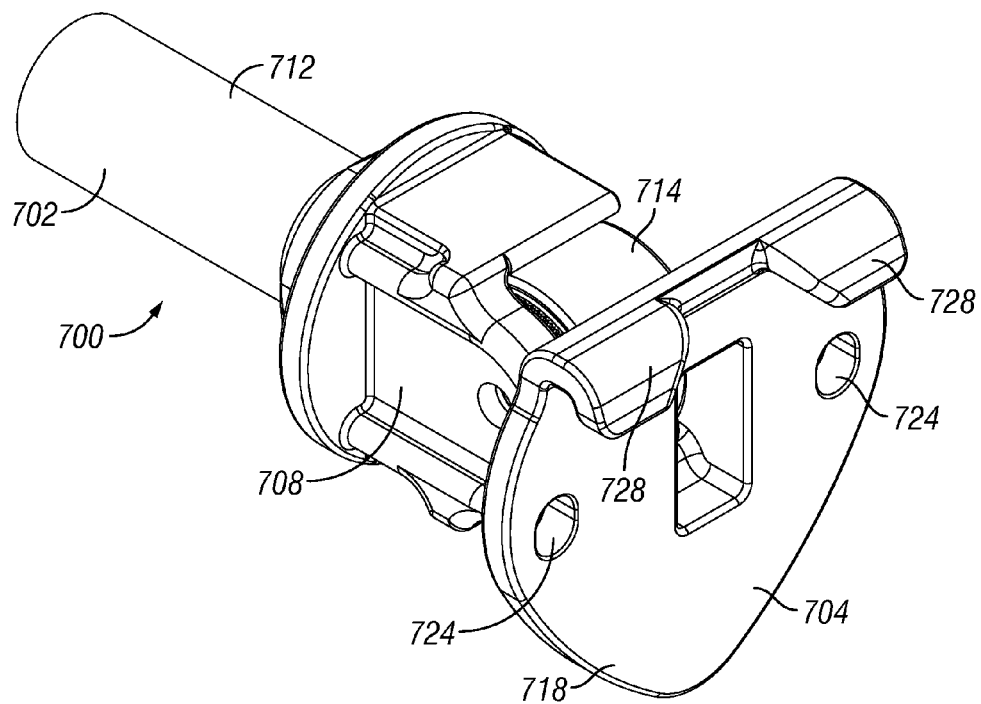
FIG. 44 is a left side perspective view of the clamp assembly in which the second clamp member is a simplex fixture.
Figure 45:
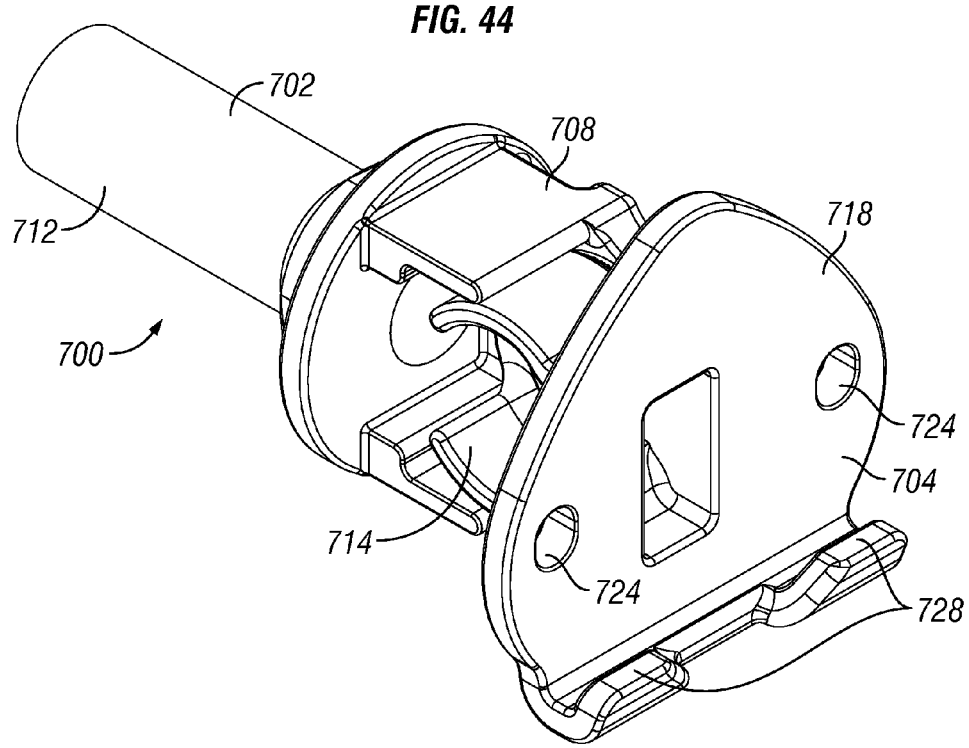
FIG. 45 is a right side perspective view of the clamp assembly in which the second clamp member is a simplex fixture.
Figure 46:
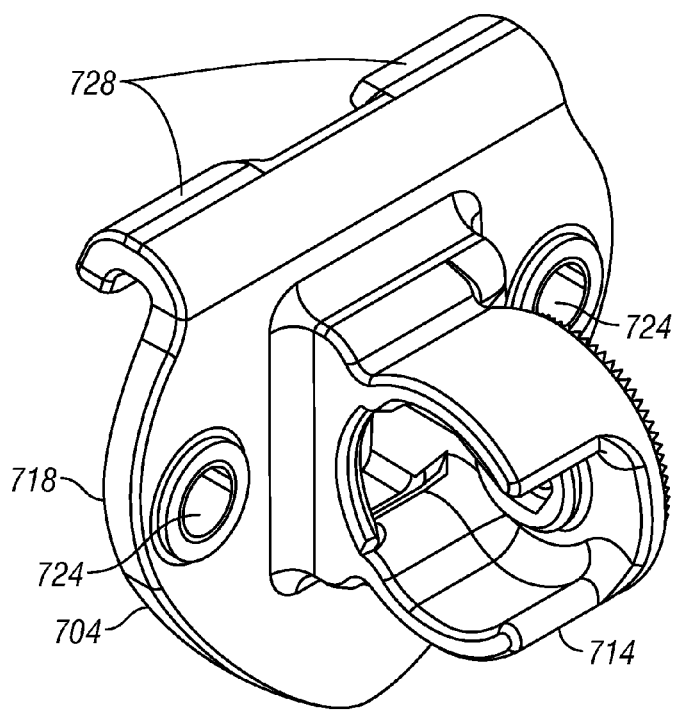
FIG. 46 is a right front perspective view of the second clamp member in the clamp assembly of FIG. 42.
Figure 47:
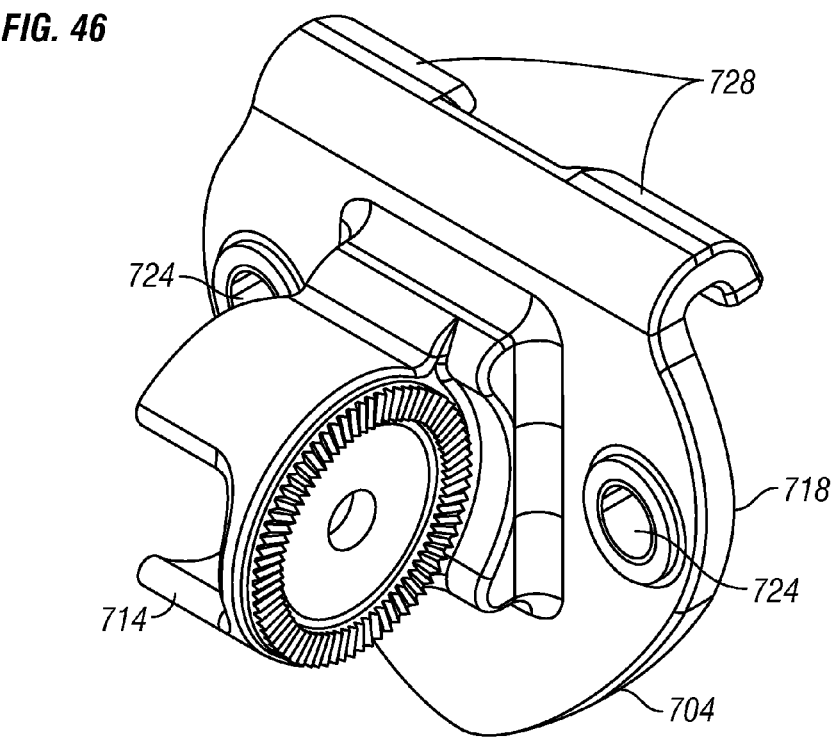
FIG. 47 is a left front perspective view of the second clamp member.
Figure 48:
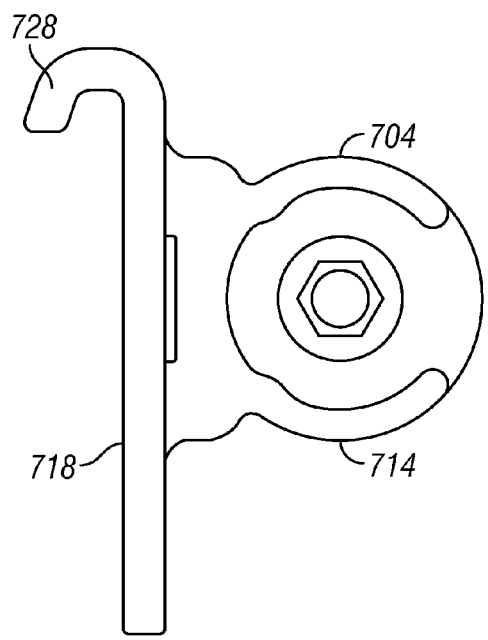
FIG. 48 is a left side elevational view of the second clamp member.
Figure 50:
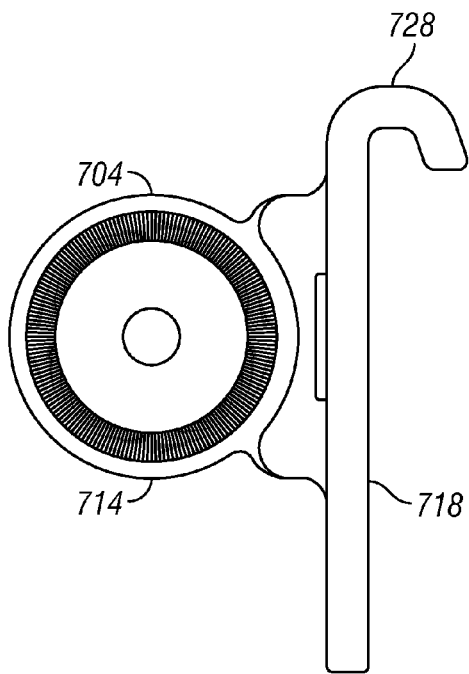
FIG. 50 is a right side view of the second clamp member.
Figure 49:
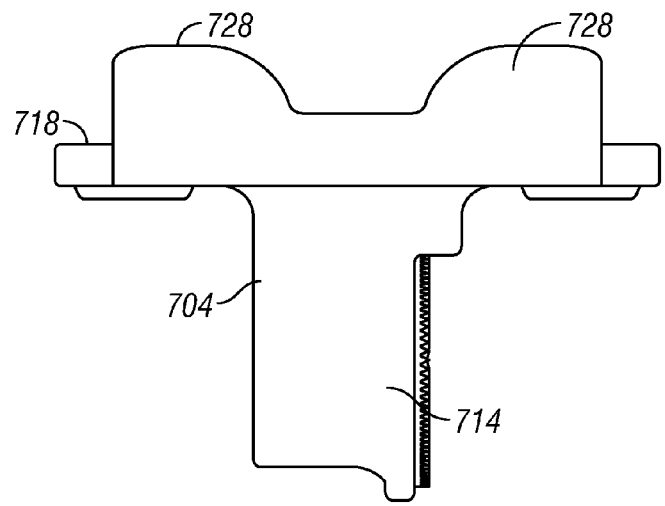
FIG. 49 is a plan view of the second clamp member.
Figure 53:
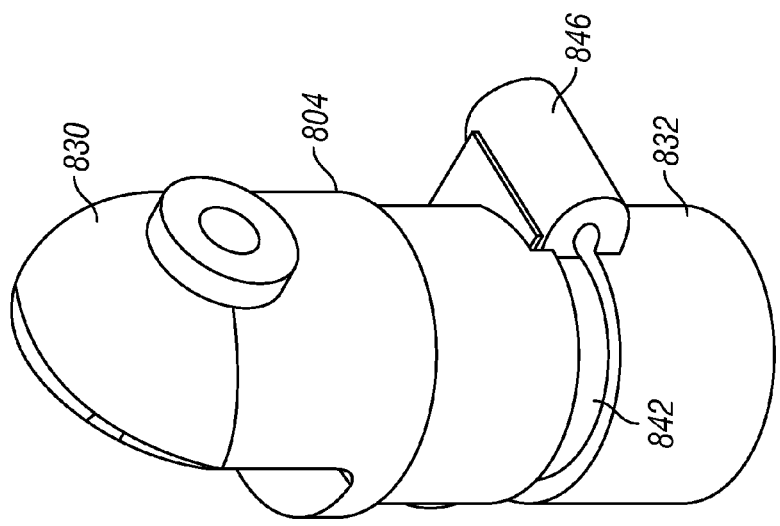
FIG. 53 is right side perspective view of the second clamp member shown in FIG. 52.
Figure 52:
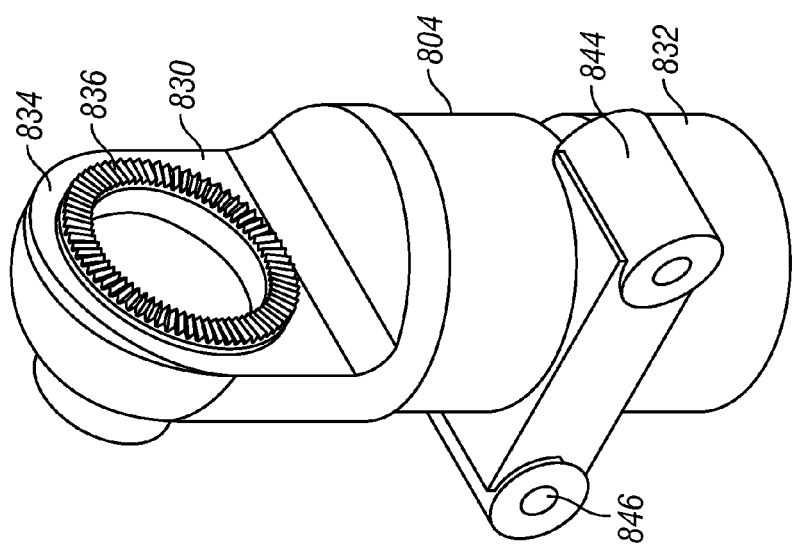
FIG. 52 is a left side perspective view of the second clamp of the articulating clamp assembly shown in FIG. 35.
Figure 51:
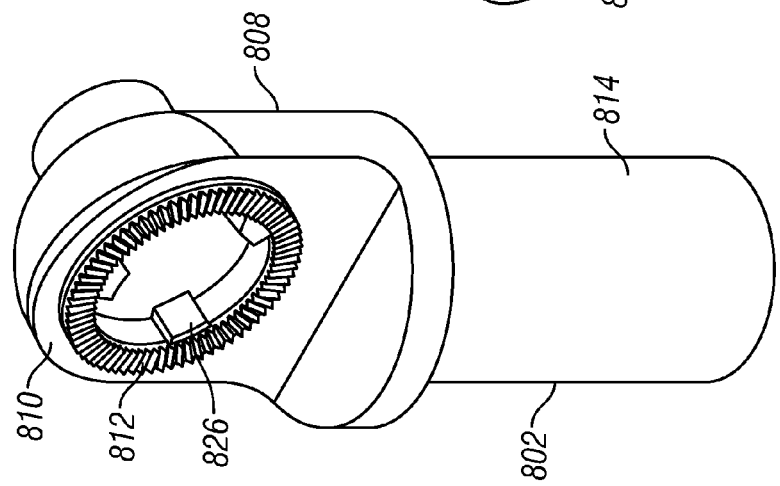
FIG. 51 is a perspective view of the first clamp member of the articulating clamp assembly shown in FIG. 35.
Figure 54:
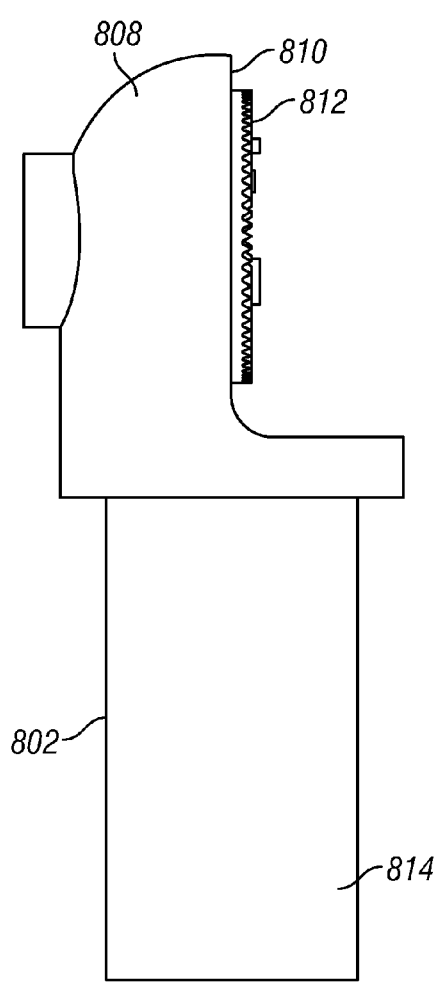
FIG. 54 is a plan view of the first clamp member.
Figure 55:
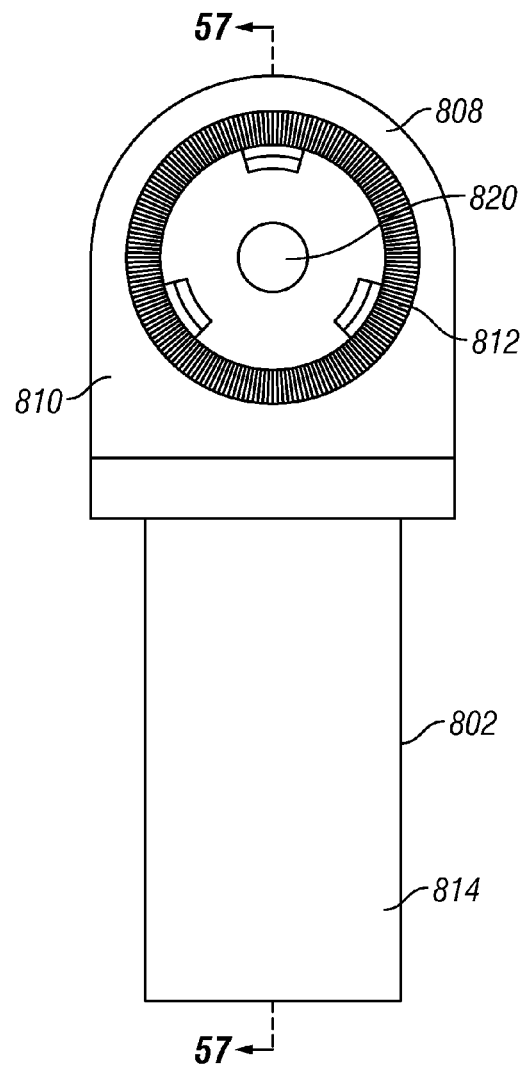
FIG. 55 is a left side elevational view of the first clamp member.

As indicated, the articulating clamp assembly of the present invention is useful with many types of traffic control devices. FIG. 35 illustrates a traffic control assembly 400 in which the traffic control device is a conventional security light 402. The light 402 is supported on a luminaire arm 404 by an articulating clamp assembly, which is described in more detail hereafter. The security light 402 includes female tubular fitting 408 that telescopically receives a member of the clamp assembly, as described below. The security light 402 is exemplary of luminaires generally. As used herein, "luminaire" denotes a lighting fixture, including but not limited to flood lights and security lights, used for illuminating vehicular roadways, pedestrian paths and walkways, parking lots, and other areas. The present invention is applicable to all such devices.

FIGS. 36 and 37 illustrate an articulating clamp assembly 500 which may be used in traffic control assembly 400 of FIG. 35 and which incorporates the wide diameter, straight, concealed conductor path and articulating joint of the previous embodiment shown in FIGS. 3-22A, described above. The clamp assembly 500 generally comprises a first clamp member 502 and second clamp member 504.

The first clamp member 502 has a first end 508 and first conductor path 510 (FIG. 37) similar to the first end 34 and conductor path 46 in the clamp member 30 of the clamp assembly 20 in FIGS. 3-7, and will not be described in detail. The second end 512 comprises a male tubular fitting telescopically receivable in the female fitting 408 of the security light 402. The first end 514 of the second clamp member 502 is similar to the first end 64 of the second clamp member 32 of the clamp assembly 20, and will not be described in detail. The second clamp member also defines a conductor path 516 similar to the conductor path 72 in the previously described second clamp member 32. Additionally, the second end 518 of the second clamp member 504 comprises a tenon sleeve similar to the tenon sleeve of the second clamp member 32 previously described. As in the previous embodiment, the second end 518 includes slots 520 for receiving the through bolt (not shown) previously described for securing the tenon sleeve to the end of the luminaire arm 404.

Shown in FIG. 38-41 is another clamp assembly 600 for supporting the security light 402 on a flat surface, such as a wall or square post, or a curved surface, such as the side of a pole or mast arm, neither of which is depicted in the drawings. The clamp assembly 600 generally comprises a first clamp member 602 and second clamp member 604. The first clamp member 602 has a first end 608 and first conductor path 610 (FIG. 39), as described in previous embodiments. The second end 612 comprises a male tubular fitting. The second clamp member 604 also defines a conductor path 616 (FIG. 39) similar to the conductor path previously described. The first end 614 of the second clamp member 602 is similar to the first end of the second clamp members previously described.

Additionally, the second end 618 of the second clamp member 604 comprises a mounting plate 620, preferably with a curved or saddle shaped portion 622 (FIGS. 40 and 41) for conforming to curved surfaces, as necessary. The mounting plate 620 preferably includes one or more bolt holes 624 (FIGS. 40 and 41) for attaching the plate to a flat surface (not shown). The mounting plate 620 preferably also comprises transverse grooves 628 (FIG. 38) for receiving connecting bands or cables (not shown) for mounting the plate to poles or mast arms. Still further, a wiring notch 630 (FIGS. 40 and 41) may be provided on one of the edges of the plate 620.

Shown in FIGS. 42-50 is another clamp assembly 700 for attaching the security light 402 to a simplex style mount (not shown). The clamp assembly 700 generally comprises a first clamp member 702 and second clamp member 704. The first clamp member 702 has a first end 708 and first conductor path 710 (FIG. 43), as described in previous embodiments. The second end 712 comprises a male tubular fitting. The second clamp member 704 also defines a conductor path 716 (FIG. 43) similar to the conductor path previously described. The first end 714 of the second clamp member 702 is similar to the first end of the second clamp members previously described.

The second end 718 of the second clamp member 704 comprises a simplex bracket plate 720 for mounting on a simplex bracket support (not shown). The simplex plate 720 preferably includes one or more bolt holes 724 (FIGS. 44 and 45) for attaching the plate to a simplex bracket support. The simplex plate 720 includes hooks 728 for engaging the simplex bracket support.

Figure 58:
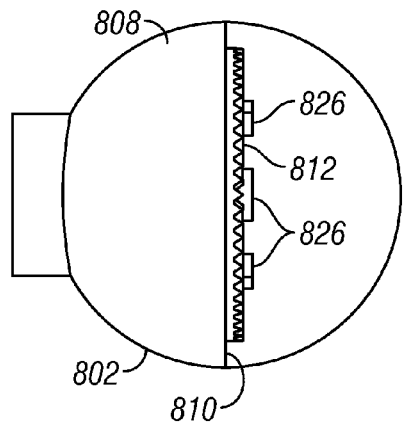
FIG. 58 is a front end elevational view of the first clamp member of FIG. 53.
Figure 59:
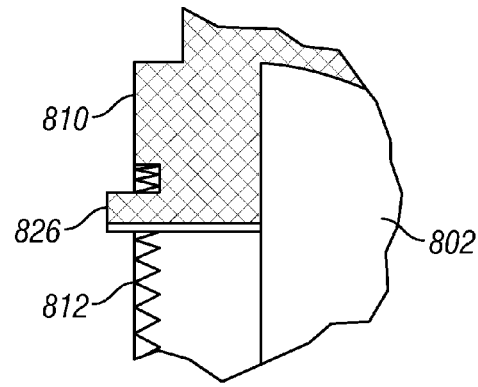
FIG. 59 is an enlarged fragmented view of the circular section identified in FIG. 57.
Figure 63:
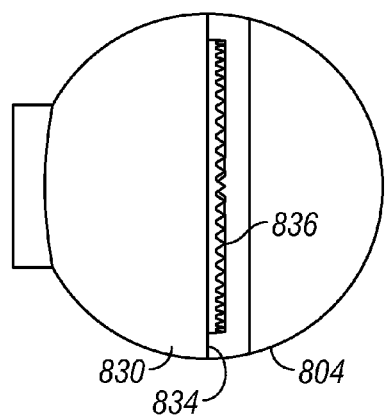
FIG. 63 is a front end elevational view of the second clamp.
Figure 64:
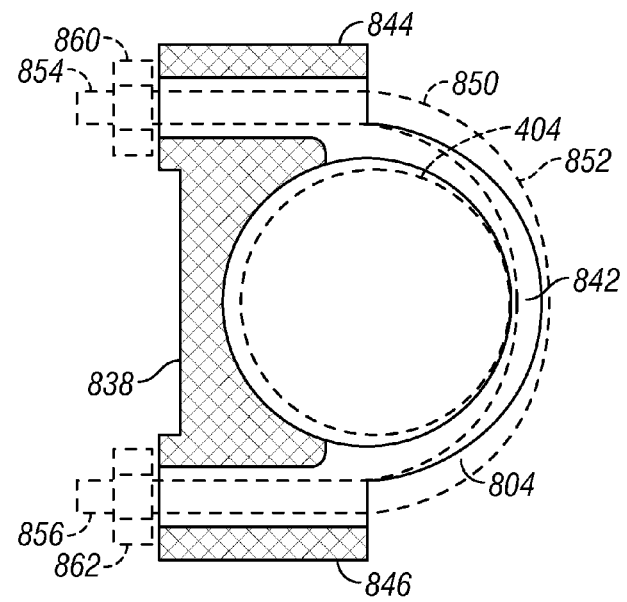
FIG. 64 is a cross sectional view taken along line 64-64 of FIG. 61.

Turning now to FIGS. 51-64 another articulating clamp assembly will be described. This clamp assembly, designated generally at 800 (FIG. 35) comprises a first clamp member 802 and a second clamp member 804. Referring to FIGS. 51-59, the first clamp member 802 has a first end 808 that defines a joint face 810 preferably with a serrated ring 812. The second end 814 comprises the male tubular fitting as previously described. The first clamp member 802 defines a first conductor path 816 (FIG. 57) that extends through its entire length. As seen in FIGS. 56 and 57, the first end 808 includes a bolt hole 820 with a hexagonal recess 822 for receiving the head of a hex head bolt (not shown), similar to that described above in reference to second clamp member 32 of the clamp assembly 20. One or more projecting tabs or teeth 826 extend from the inner circumference of the opening 828 in joint face 810, as seen in FIGS. 57-59.

With reference to FIGS. 60-64, the second clamp member 804 includes a first end 830 and a second end 832. The first end 830 defines a joint face 834 with a serrated ring 836 for mating engagement with the serrated ring 812 on the joint face 810 of the first clamp member 802. The second end 838 of the second clamp member 804 comprises a tenon sleeve for mounting on the end of the luminaire arm 404 (FIG. 35) as previous described. The body of the second clamp member 804 defines an end-to-end second conductor path 840, as shown in FIG. 62. Now it will be apparent that the teeth 826 on the joint face 810 if the first clamp member 802 facilitate the alignment of the serrated rings 812 and 836 of the two opposing joint faces 810 and 834.

With continuing reference to FIGS. 52, 53, and 60-64 another advantageous feature of this embodiment will be explained. In the previously described embodiment of FIGS. 3-22A and FIGS. 36-37, the tenon sleeve on the second end 66 of the second clamp 32 of the assembly 20 and the tenon sleeve on the end 518 of the second clamp member 504 of the assembly 500 both are secured to the end of the support arm (mast arm or luminaire arm) by a transverse through-bolt and slots in the tenon sleeve and support arm. In this embodiment, an alternative means is used to secure the second end 838 of the second clamp member 804 to the luminaire arm 404.

As best seen in FIGS. 52, 53, and 61 and 64, an elongate slot 842 is provided in the second end 838. The slot 842 extends circumferentially around a portion of the sidewall of the tenon sleeve, and preferably extends around about half the circumference of the sleeve. At the each end of the slot 842 is a tangentially oriented boss 844 and 846 formed on the outside of the sleeve 838. The clamp assembly 800 may include a U-bolt 850, shown in phantom in FIG. 64. The U-bolt 850 is sized so that the curved base 852 of the bolt is received in the slot 842 with the threaded ends of the arms 854 and 856 of the bolt extend through the bosses 844 and 846. In this way, when the nuts 860 and 862 are tightened on the ends of the arms 854 and 856, the curved base 852 of the U-bolt 850 grips the side of the luminaire arm 404 and secures the sleeve in position. Because the U-bolt 850 does not extend through the luminaire arm 404, the rotational position of the light 402 may be adjusted easily by simply loosening the nuts 850 and 852.

The embodiments shown and described above are exemplary. Many details are often found in the art and, therefore, many such details are neither shown nor described herein. It is not claimed that all of the details, parts, elements, or steps described and shown were invented herein. Even though numerous characteristics and advantages of the present inventions have been described in the drawings and accompanying text, the description is illustrative only. Changes may be made in the details, especially in matters of shape, size, and arrangement of the parts within the principles of the inventions to the full extent indicated by the broad meaning of the terms of the attached claims. The description and drawings of the specific embodiments herein do not point out what an infringement of this patent would be, but rather provide an example of how to use and make the invention. Likewise, the abstract is neither intended to define the invention, which is measured by the claims, nor is it intended to be limiting as to the scope of the invention in any way. Rather, the limits of the invention and the bounds of the patent protection are measured by and defined in the following claims.

What is claimed is:

1. An articulating clamp assembly for supporting a traffic control device on a support structure, the clamp assembly comprising:
   a first clamp member having a first end and a second end, an opening in the first end, an opening in the second end, and an internal channel connecting the openings in the first and second ends forming a first conductor path segment therethrough, wherein the first conductor path is substantially straight, the first clamp member having a longitudinal axis, wherein the second end is connectable to the luminaire;
   a second clamp member having a first end and a second end, an opening in the first end, an opening in the second end, and an internal channel connecting the openings in the first and second ends forming a second conductor path segment therethrough, wherein the second conductor path in the second clamp member is substantially straight, the second clamp member having a longitudinal axis, wherein the second end is connectable to the support structure;
   wherein the first end of the first clamp member and first end of the second clamp member are connectable to each other to form an articulating joint that connects the first and second conductor path segments to form a concealed conductor path extending through the connected first and second clamp members, wherein the articulating joint permits adjustment of the angle formed by the longitudinal axis of the first clamp member relative to the longitudinal axis of the second clamp member, and wherein the concealed conductor path extending through the connected first and second clamp members is straight when the longitudinal axes of the first and second clamp members are parallel; and
   wherein the articulating joint comprises a first planar joint face on the first end of the first clamp member and a second planar joint face on the first end of the second clamp member, wherein the first planar joint face defines a first engagement surface and a first plane, wherein the second planar joint face defines a second plane and a second engagement surface that matingly and adjustably engages the first engagement surface on the first planar joint face whereby one of the first and second planar joint faces can be rotated relative to the other of the first and second planar joint faces to adjust the angle formed by the longitudinal axis of the first clamp member relative to the longitudinal axis of the second clamp member, and wherein when the first and second engagement surfaces are matingly engaged the planes defined by the first and second planar joint faces are parallel to each other and to the longitudinal axes of both the first and second clamp members.

2. The clamp assembly of claim 1 wherein the first engagement surface comprises a first serrated ring on the first end of the first clamp member and the second engagement surface comprises a second serrated ring-on the first end of the second clamp member.

3. The clamp assembly of claim 2 wherein the clamp assembly further comprises a bolt for securing the joint in a selected position.

4. The clamp assembly of claim 3 wherein in the assembled clamp assembly the joint is positioned on one side of the concealed conductor path and the bolt does not extend across the conductor path.

5. The clamp assembly of claim 1 wherein the clamp assembly further comprises a bolt for securing the joint in a selected position, path and wherein the bolt does not extend across the conductor path.

6. The clamp assembly of claim 1 wherein the traffic control device is a luminaire, wherein the support structure is a luminaire arm and wherein the second end of the second clamp member comprises a tenon sleeve telescopically receivable on the end of the luminaire arm.

7. The clamp assembly of claim 6 wherein the tenon sleeve of the second end of the second clamp member comprises a U-bolt having a curved base portion and arms.

8. The clamp assembly of claim 7 wherein the tenon sleeve includes an elongate slot extending circumferentially partially around the tenon sleeve, the slot sized to receive the curved base portion of the U-bolt, and wherein the tenon sleeve further includes a pair of bosses positioned at the ends of the slot and configured to receive the arms of the U-bolt.

9. The clamp assembly of claim 1 wherein the support structure is a pole and wherein the second end of the second clamp member comprises a saddle plate fittable to a side of the pole.

10. The clamp assembly of claim 1 wherein the support structure is a simplex bracket support and wherein the second end of the second clamp member comprises a simplex bracket plate fittable to the simplex bracket support.

11. The clamp assembly of claim 10 wherein the simplex bracket plate and support are connectable using two bolts.

12. The clamp assembly of claim 1 further comprising a hex-head bolt for securing the joint in a selected position, wherein one of the first end of the first clamp member and the first end of the second clamp member comprises a hex-shaped bolt head receiving space sized to non-rotatingly receive the head of the hex-head bolt, and wherein the bolt head receiving space is sized so that the bolt head is flush with the bolt head receiving space when the first and second clamp members are bolted together.

13. A traffic control assembly comprising a luminaire and the articulating clamp assembly of claim 1.

\* \* \* \* \*

UNITED STATES PATENT AND TRADEMARK OFFICE
CERTIFICATE OF CORRECTION

PATENT NO. : 9,599,275 B1
APPLICATION NO. : 14/332711
DATED : March 21, 2017
INVENTOR(S) : A. Phillip Parduhn et al.

It is certified that error appears in the above-identified patent and that said Letters Patent is hereby corrected as shown below:

On the Title Page

Column 2, (57) Abstract, Line 7: replace "with saddle" with --with a saddle--.

In the Specification

Column 1, Line 63: replace "is left" with --is a left--.
Column 2, Line 5: replace "of prior" with --of the prior--.
Column 2, Line 8: replace "is horizontal" with --is a horizontal--.
Column 2, Line 10: replace "ends" with --end--.
Column 2, Line 15: replace "is horizontal" with --is a horizontal--.
Column 2, Line 17: replace "ends" with --end--.
Column 2, Line 53: replace "for a" with --for--.
Column 3, Line 23: replace "is right" with --is a right--.
Column 3, Line 57: replace "device" with --Device--.
Column 4, Line 37: replace "comprises" with --comprises a--.
Column 5, Line 24: replace "on to" with --onto--.
Column 5, Line 53: replace "installation" with --installation,--.
Column 5, Line 54: replace "because the" with --because of the--.
Column 6, Line 41: replace "respects" with --respects,--.
Column 6, Line 43: replace "The assembly clamp" with --The assembled clamp--.
Column 6, Line 44: replace "defines" with --defines a--.
Column 7, Line 4: replace "in installation" with --in the installation--.
Column 8, Line 29: replace "51-64" with --51-64,--.
Column 8, Line 42: replace "to second" with --to the second--.
Column 8, Line 56: replace "if the" with --of the--.
Column 9, Line 8: replace "At the each" with --At each--.
Column 9, Line 14: replace "extend" with --extending--.

Signed and Sealed this
Third Day of October, 2017

Joseph Matal
*Performing the Functions and Duties of the*
*Under Secretary of Commerce for Intellectual Property and*
*Director of the United States Patent and Trademark Office*

Column 9, Line 28: replace "inventions" with --invention--.
Column 9, Line 32: replace "inventions" with --invention--.